US012497832B2

(12) United States Patent
Neubauer

(10) Patent No.: US 12,497,832 B2
(45) Date of Patent: Dec. 16, 2025

(54) APPARATUS AND KIT FOR MOBILE LADDER CONVERSION

(71) Applicant: Blue Moon Designs, LLC, Bend, OR (US)

(72) Inventor: Dale Martin Neubauer, Bend, OR (US)

(73) Assignee: BLUE MOON DESIGNS, LLC, Bend, OR (US)

( * ) Notice: Subject to any disclaimer, the term of this patent is extended or adjusted under 35 U.S.C. 154(b) by 440 days.

(21) Appl. No.: 18/178,497

(22) Filed: Mar. 4, 2023

(65) Prior Publication Data

US 2024/0295145 A1 Sep. 5, 2024

(51) Int. Cl.

| | |
|---|---|
| ***E06C 1/397*** | (2006.01) |
| ***E06C 1/20*** | (2006.01) |
| ***E06C 1/383*** | (2006.01) |
| ***E06C 7/42*** | (2006.01) |

(52) U.S. Cl.
CPC ................ *E06C 1/20* (2013.01); *E06C 1/383* (2013.01); *E06C 1/397* (2013.01); *E06C 7/423* (2013.01)

(58) Field of Classification Search
CPC . E06C 1/20; E06C 1/383; E06C 1/397; E06C 7/423; E06C 1/393
See application file for complete search history.

(56) References Cited

U.S. PATENT DOCUMENTS

| | | | | |
|---|---|---|---|---|
| 2,624,590 A * | 1/1953 | Tilton | B25H 5/00 182/180.1 |
| 3,684,055 A * | 8/1972 | Rice | E06C 1/397 182/180.1 |
| 6,305,496 B1 * | 10/2001 | Bieszczad | E06C 1/39 182/15 |
| 10,100,575 B1 | 10/2018 | Neubauer | |
| 2008/0217103 A1 * | 9/2008 | Pucek | E06C 1/39 182/15 |
| 2018/0094484 A1 * | 4/2018 | Frame | E06C 1/20 |

FOREIGN PATENT DOCUMENTS

| | | | |
|---|---|---|---|
| IT | MI20130944 A1 * | 12/2014 | E06C 1/397 |

OTHER PUBLICATIONS

"Steel Rolling Ladders", Ballymore: Elevation Through Innovation, accessed online Mar. 8, 2023. Retrieved from <url: https://www.ballymore.com/products/steel-rolling-ladders>, 2 pages.

* cited by examiner

*Primary Examiner* — Cassandra Davis
(74) *Attorney, Agent, or Firm* — Leber IP Law; Celia H. Leber

(57) ABSTRACT

An apparatus and kit for conversion of a folding ladder to a mobile platform. The apparatus includes a folding ladder structure with mounting placements for affixing a pair of wheel attachments. The wheel attachments provide selective movement of a set of wheels between a ground-engaging position and an elevated non-ground-engaging position. The kit including the mounting placements and the wheel attachments capable of use with a folding ladder to provide stability and mobility of the ladder configured with the kit.

9 Claims, 33 Drawing Sheets

APPARATUS AND KIT FOR MOBILE LADDER CONVERSION

FIELD OF THE INVENTION

This invention relates generally to folding ladders and more particularly to folding ladder conversion to a fixed rigid ladder having selective mobility.

BACKGROUND OF THE INVENTION

In the field of ladders, there many different types of folding and non-folding ladders. Generically, ladders include a step unit and corresponding support with a brace therebetween. In the context of non-folding ladders, the brace is a fixed structure. However, in the context of a folding ladder, the brace includes multiple pivot points whereby the step unit and support are allowed to move relative to one another in a scissor-like manner.

Often, non-folding ladders are also accompanied by wheels mounted to the base of the given ladder. In many instances, these wheeled ladders include weight activated lockstep ladders such as those manufactured by Ballymore Safety Products of Coatesville, PA. These specialty ladders may form a maintenance platform that are wheeled from location to location. Upon a user stepping onto such ladders, the weight of the user causes a spring mechanism to preclude wheel movement by engagement of ladder feet with the ground. Likewise, removal of the weight of the user from the ladder causes the spring mechanism to raise the ladder feet off the ground thereby exposing the wheels to the ground thus enabling mobility of the ladder by the user.

One known folding ladder effective in the area of helicopter maintenance is U.S. Pat. No. 10,100,575 titled "Folding Ladder with Brace-Locking Apparatus" which is incorporated by reference herein in its entirety. This ladder includes wheels suitable for facilitating movement of the ladder from location to location by rocking action of the ladder between a normal operating position and a mobile position in either the folded or extended configurations.

Conventional folding ladders, however, frequently fail to offer both stability and ease of mobility.

SUMMARY OF THE INVENTION

The present invention provides an apparatus and kit for conversion of a folding ladder to a rigid and stable mobile maintenance platform. It should be understood that the present invention may be utilized by a wide variety of users ranging from specialized maintenance personnel such as in the context of helicopter repair to homeowners such as in the context of a garage workshop, and any situation where a folding ladder is desired to be both stable and mobile.

In accordance with a first aspect, the present invention provides an apparatus forming a mobile ladder, said apparatus comprising: a step unit having a plurality of treads and a first pair of feet; a support leg having a second pair of feet; a hinge point connecting said step unit with said support leg; a brace mechanism attached between said step unit and said support leg; a plurality of mounting placements each provided near said first and second pair of feet; and first and second wheel attachments each mountable to corresponding ones of said plurality of mounting placements between one of said first pair of feet and one of said second pair of feet; wherein said first and second wheel attachments are movable between a first raised position and a second lowered position.

In accordance with another aspect, the present invention further provides an apparatus for use with ladder having a step unit with a plurality of treads and a first pair of feet, a support leg having a second pair of feet, a hinge point connecting said step unit with said support leg, and a brace mechanism attached between said step unit and said support leg, said apparatus comprising: a plurality of mounting placements each affixable near said first and second pair of feet; and first and second wheel attachments each including a pair of wheels and detachably mounted to corresponding ones of said plurality of mounting placements between one of said first pair of feet and one of said second pair of feet; wherein said first and second wheel attachments are movable between a first raised position and a second lowered position.

In accordance with still another aspect, the present invention provides a kit for use with a folding ladder having a step unit with a plurality of treads and a first pair of feet, a support leg having a second pair of feet, a hinge point connecting said step unit with said support leg, and a brace mechanism attached between said step unit and said support leg, said kit comprising: a plurality of mounting placements each capable of being affixable near said first and second pair of feet; and first and second wheel attachments each including a pair of wheels and capable of being detachably mounted to corresponding ones of said plurality of mounting placements between one of said first pair of feet and one of said second pair of feet; wherein said first and second wheel attachments upon assembly of said plurality of mounting placements with said first and second wheel attachments are capable of movement between a first raised position and a second lowered position.

These and other aspects will become apparent from the following drawings and detailed descriptions of exemplary embodiments.

DETAILED DESCRIPTION

The following detailed description provides examples of presently contemplated modes of implementing embodiments of the invention. This description is not to be taken in a limiting sense, but is made merely for the purpose of illustrating general principles of embodiments of the invention. The scope of the invention will be best defined by the claims.

Figure 1:
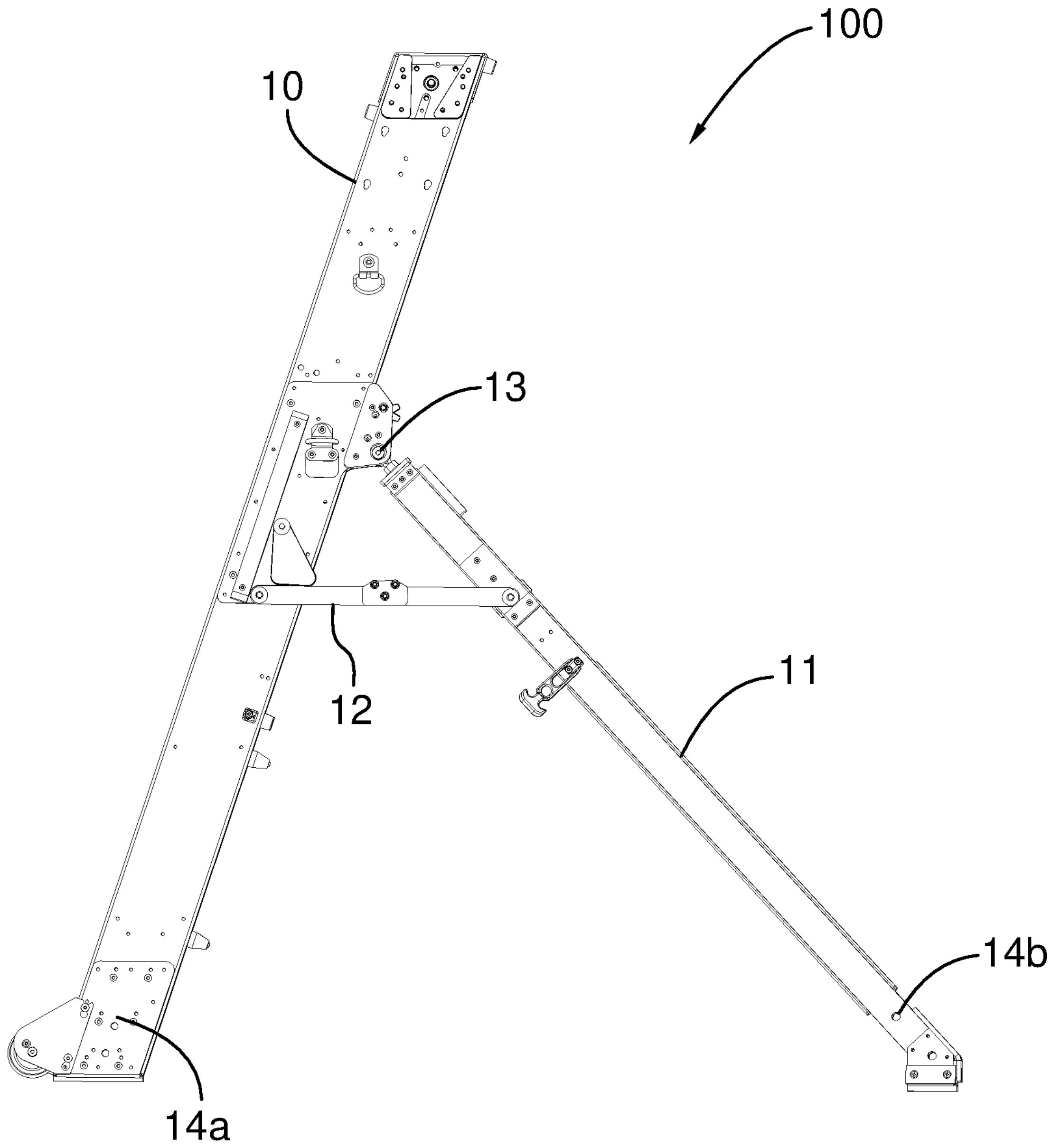
FIG. 1 shows a side view of a folding ladder utilizing mounting placements in accordance with the present invention.

With regard to FIG. 1, there is shown a side view of a folding ladder 100 utilizing mounting placements 14*a* and 14*b* in accordance with the present invention. Here, a step unit 10 and support leg 11 are joined at a hinge point 13. As the folding ladder is shown in the open/deployed position, a two-section brace mechanism 12 is shown folded into an aligned position thus retaining the step unit 10 and support leg 11 in a general A-frame manner as is typical in the folding ladder art. In accordance with the present invention, mounting placements 14*a* and 14*b* are provided, respectively, at the base of the ladder unit 10 and support leg 11. As should be readily apparent to one of skill in the ladder art, the mounting placements 14*a* and 14*b* may be provided at the time of manufacture of the generally three part structure (step/support/brace) that forms the folding ladder 100 or, alternatively, may be provided post-manufacture as part of a kit which includes mounting placement designed to be added to the step unit 10 and support leg 11.

As shown, the mounting placement 14*a* may be provided in the form of a plate as shown and suitably dimensioned and fabricated from suitably durable material to ensure secure attachment of a wheel attachment (described further below). Likewise, the mounting placement 14*b* may be provided in the form of a suitably reinforced through-hole as shown and suitably dimensioned and fabricated from suitably durable material to ensure secure attachment of a wheel attachment (described further below). Suitable materials for the mounting placements 14*a* and 14*b* may include, for example, aluminum, steel or high-strength composite material.

Figure 2:
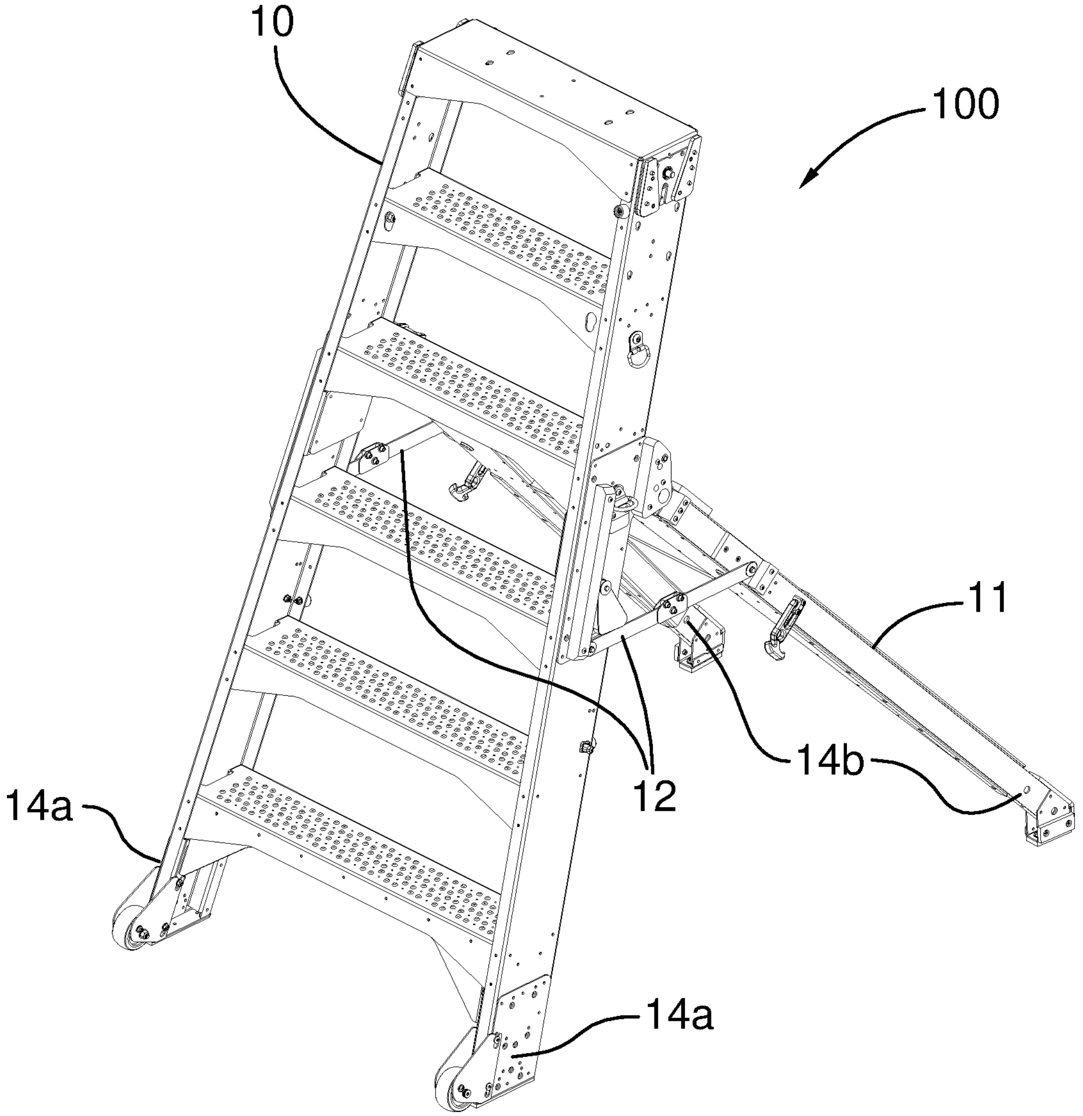
FIG. 2 is a perspective view of the ladder as shown in FIG. 1.

With regard to FIG. 2, there is shown a perspective view of the ladder 100 as shown in FIG. 1. It should be readily apparent that two brace mechanisms 12 are provided on both the right and left sides of the ladder 100 as is typical in the ladder art. Likewise, the mounting placements 14*a* and 14*b* are also duplicated on both the right and left sides of the ladder 100.

Figure 3:
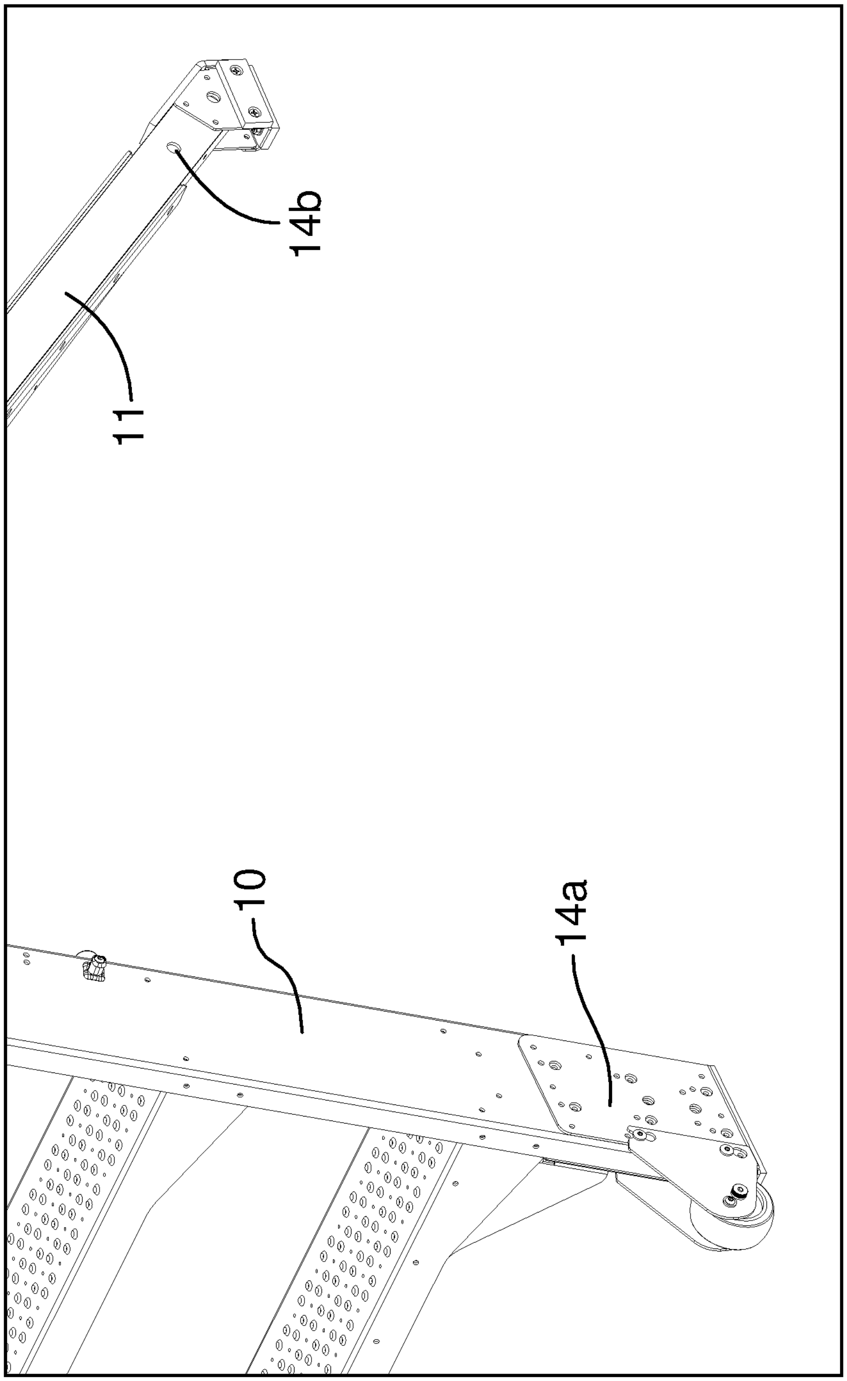
FIG. 3 is a close-up, perspective view showing one set of mounting placements as shown in FIG. 1.
Figure 4:
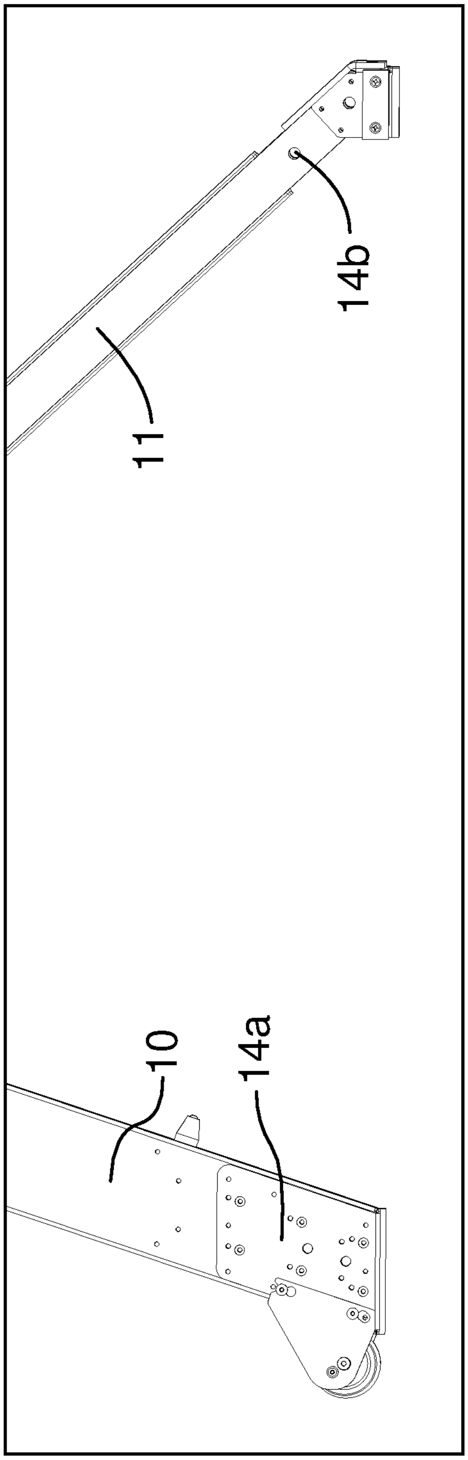
FIG. 4 is a close-up, side view of the mounting placements as shown in FIG. 3.

With regard to FIG. 3, there is shown a close-up, perspective view illustrating the right side of the step unit 10 and support leg 11 thus detailing one set of mounting placements 14*a* and 14*b* as shown in FIG. 1. This arrangement may also be seen in FIG. 4 which is a close-up, side view of the mounting placements 14*a* and 14*b* as shown in FIG. 3.

Figure 5:
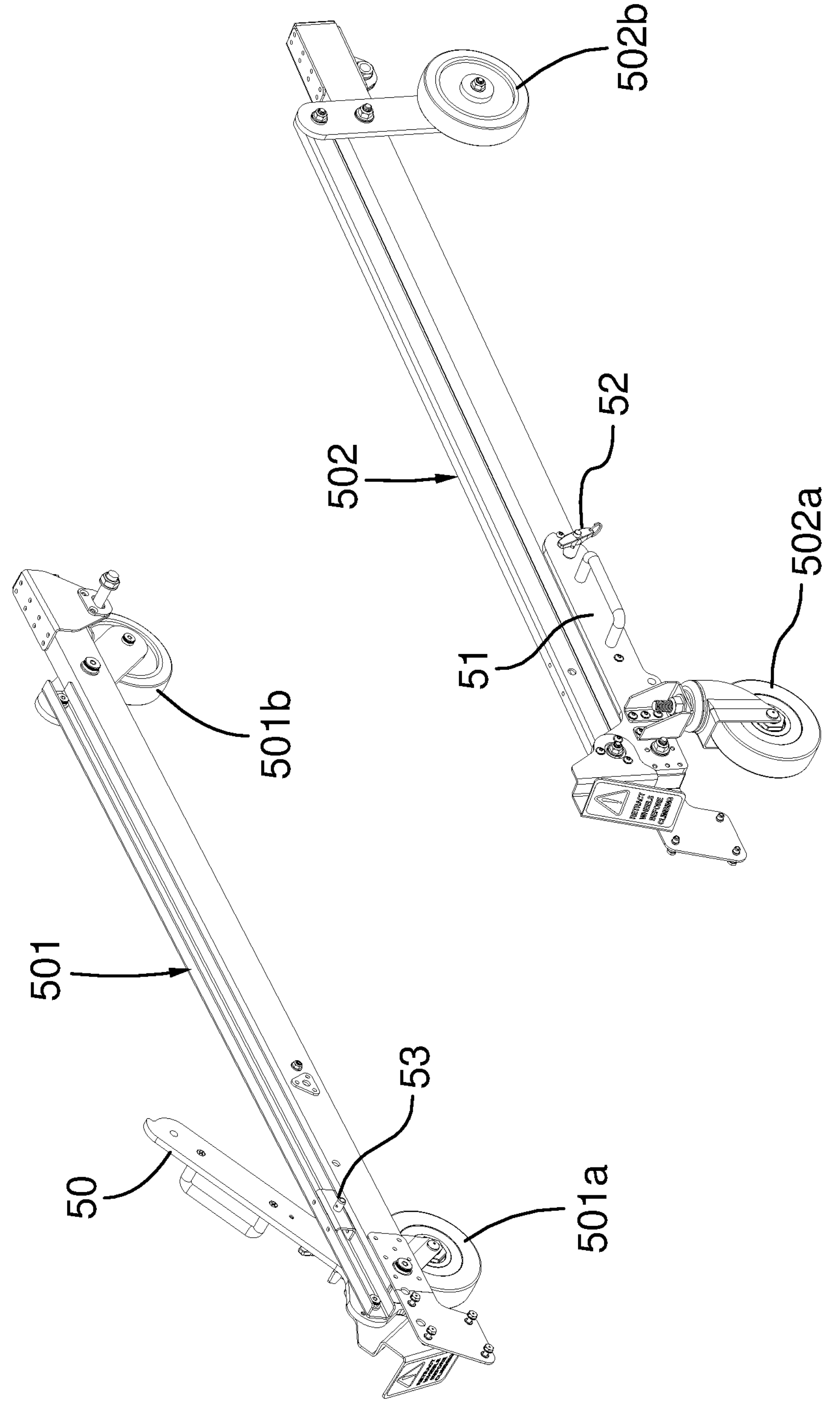
FIG. 5 is a perspective view of a pair of wheel attachments in accordance with the present invention.

As should be understood, wheel attachments in accordance with the present invention are provided in pairs as illustrated in FIG. 5 which is a perspective view of a pair of wheel attachments 501 and 502 in accordance with the present invention. Each wheel attachment 501 and 502 includes, respectively, pivoting wheels 501*a* and 502*b* and non-pivoting wheels 501*b* and 502*b* located at opposite ends of the wheel attachments. As may be seen, wheel attachment 501 is shown in a disengaged position whereby an engagement lever 50 is located in an up position while wheel attachment 502 is shown in a deployed position such that an engagement lever 51 is located in a down position. As will be further explained below, through cantilever action the wheels sets 501*a*/501*b* and 502*a*/502*b* are selectively raised and lowered (i.e., disengaged and deployed) by manual movement of the engagement levers 50 and 51. Locking pins 52 and 53 retain the levers 50 and 51 in the up or down positions and may be moved manually from corresponding holes. The locking pins 52 and 53 may be attached via a chain or cord (not shown) to the corresponding engagement levers 50 and 51 so as to reduce the likelihood of pin loss.

In a similar manner to the mounting placements previously shown and described, it should be understood that the pair of wheel attachments 501 and 502 in accordance with the present invention may be provided at the time of manufacture of the generally three part structure (step/support/brace) that forms the folding ladder 100 or, alternatively, may be provided post-manufacture as part of a kit which includes the mounting placements along with the separate pair of wheel attachments. Thus, the kit may be formed by a set of mounting placements and corresponding set of wheel attachments. The kit may be provided with an accompanying folding ladder or may be fabricated of differing sizes so as to accommodate standard types of existing (i.e., pre-manufactured) folding ladders.

Figure 6:
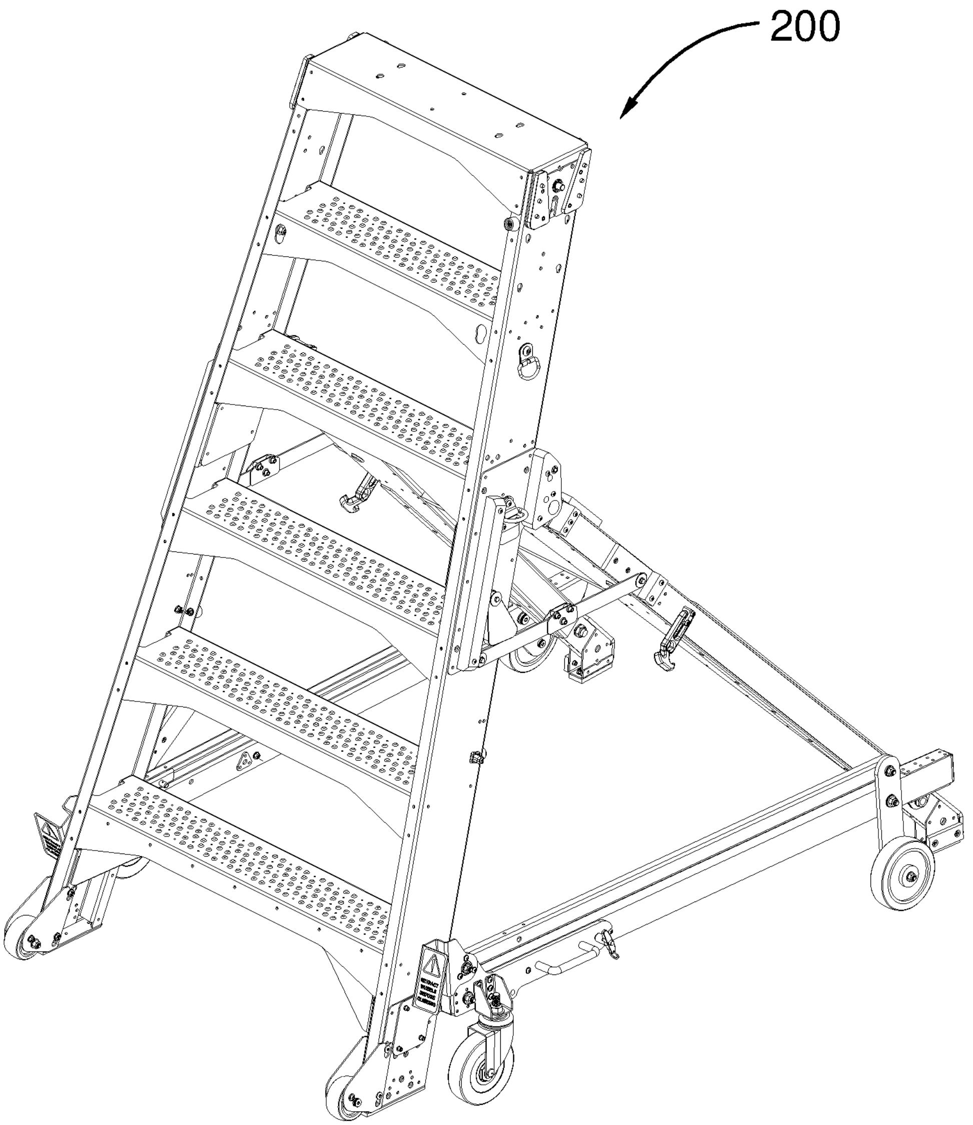
FIG. 6 is a perspective view of the ladder of FIG. 1 assembled with the wheel attachments of FIG. 5 where the right wheel attachment only is wheel-deployed.
Figure 7:
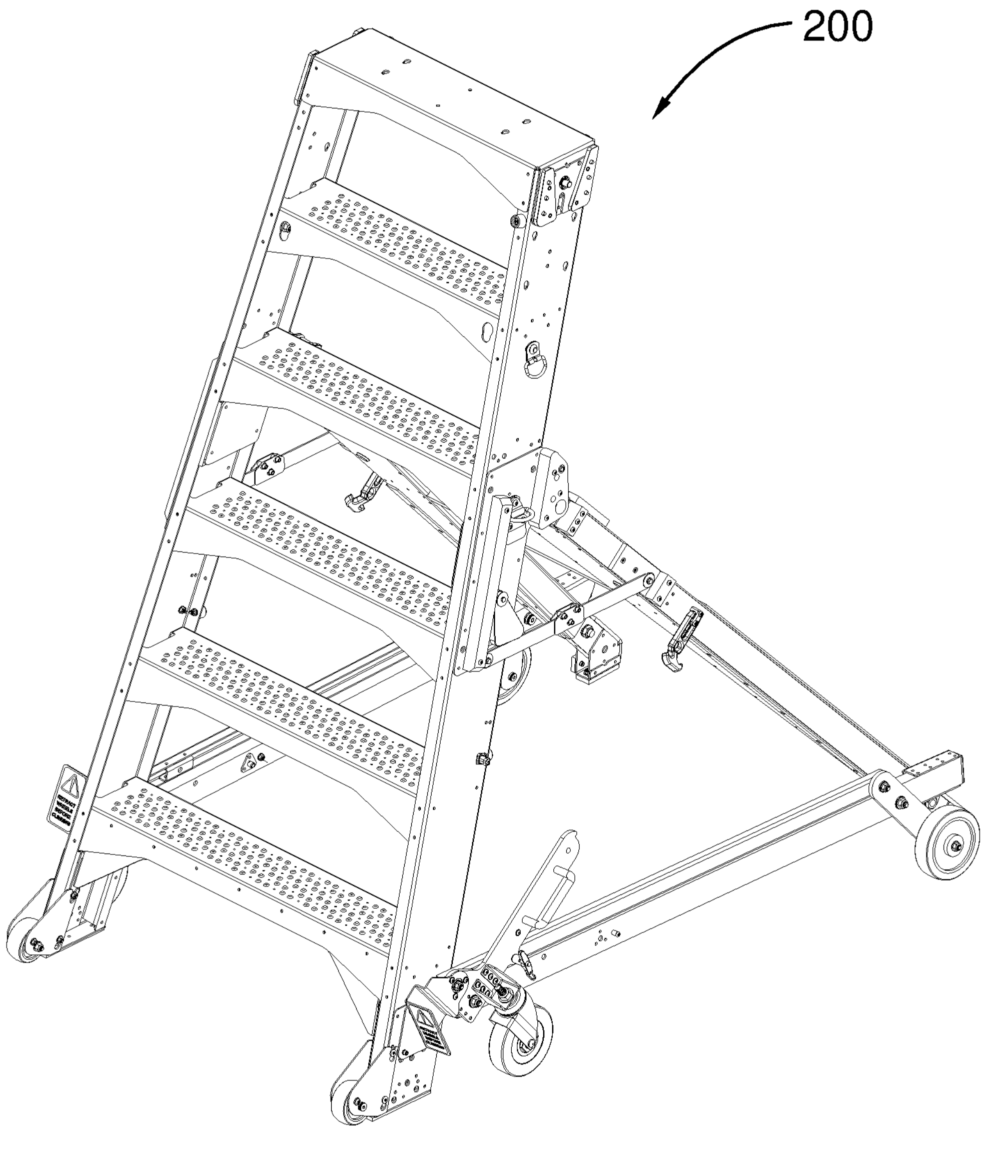
FIG. 7 is a perspective view of the ladder of FIG. 6 where the left wheel attachment only is wheel-deployed.

With reference to FIG. 6 and FIG. 7, the present invention 200 in terms of a fully assembled folding ladder and wheel kit combination is shown. As previously suggested, the wheel kit may be provided separate from or with the folding ladder in a disassembled or fully assembled combination without straying from the intended scope of the present invention. Indeed, a disassembled configuration whereby the wheel kit is provided separate from the ladder would of course be conducive to packaging shipping/transport of the invention as a whole. As may be seen from FIG. 6 which illustrates a perspective view of the ladder of FIG. 1 assembled with the wheel attachments of FIG. 5, the right wheel attachment only is wheel-deployed whereas in the perspective view of the ladder of FIG. 6, the left wheel attachment only is wheel-deployed.

Figure 8:
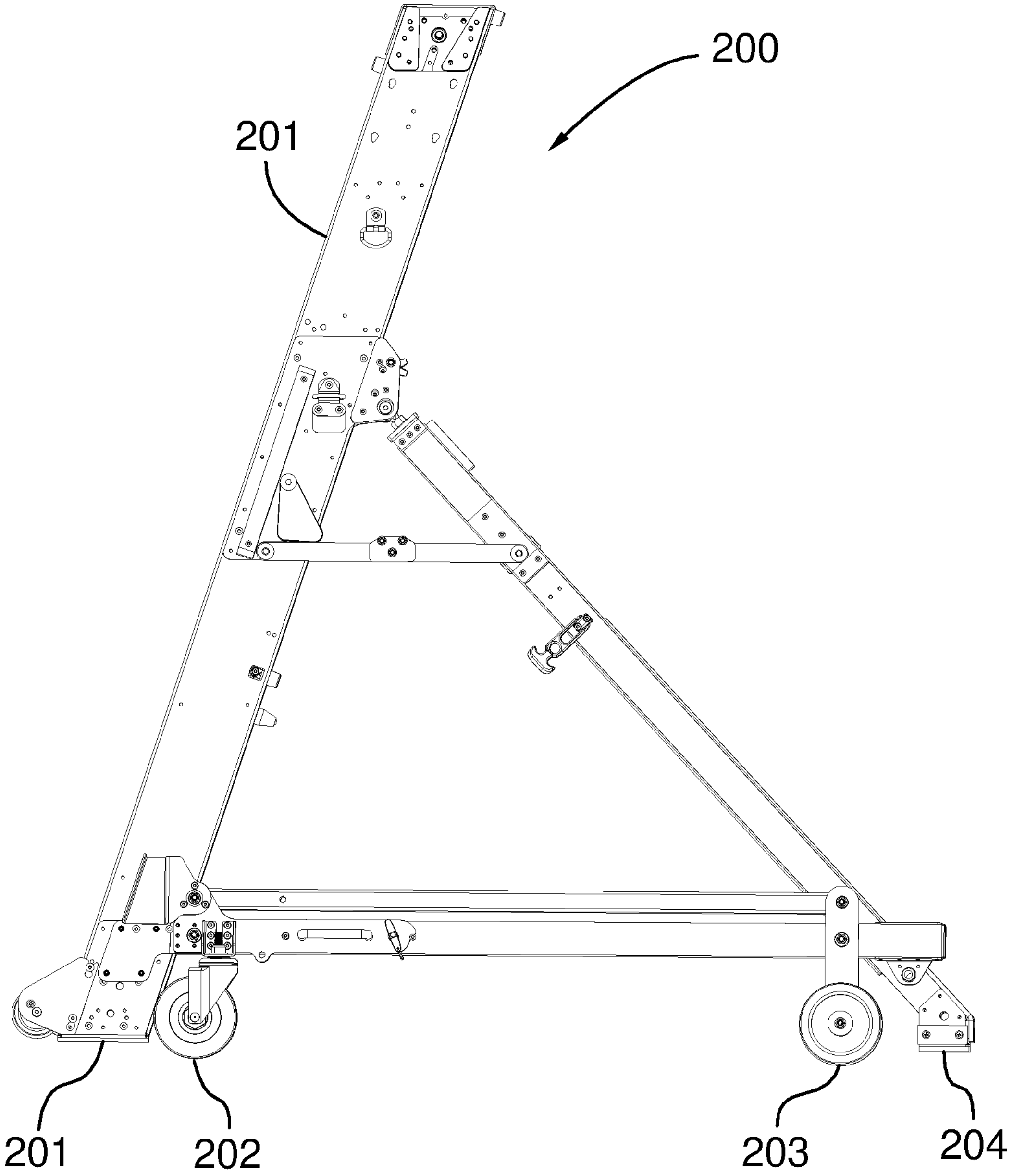
FIG. 8 is a side view of the ladder of FIG. 1 assembled with the wheel attachments of FIG. 5 where the wheel attachments are wheel-deployed.

With reference to FIG. 8 there is shown a side view of the ladder of FIG. 1 in an assembled configuration 200 with the wheel attachments of FIG. 5 whereby the wheel attachments are wheel-deployed. As should be noted from the side view, the wheels 202 and 203 when deployed are lower than the feet 201 and 204. While only one side of the assembled configuration 200 is shown, it should be readily apparent that the other side is substantially a mirror image of the side shown. In this configuration as shown with all wheels deployed, the assembled configuration 200 is therefore in a mobile state whereby the feet 201 and 204 do not touch the ground surface. However, should a user place their weight on the first step of the ladder unit 201, the entirety of the assembled configuration 200 will pivot (i.e. tilt) about the wheel 202 (i.e., both front wheels beneath the ladder unit) until the ladder feet will touch the ground surface. In this manner, the assembled configuration 200 will be stabilized and effectively prevented from movement thereby negating the mobile state in favor of a secure and stable (i.e., non-mobile, fixed) state. Such operation therefore being an advantageous safety feature of the present invention due to the tilting action which effectively indicates to a user stepping onto the first tread that the ladder is in a mobile state. It should further be understood from the side view shown in FIG. 8 that the placement of the wheels inwardly from the ladder feet enhances this advantageous safety feature in terms of enabling the pivoting action about the ladder-side wheel set when both wheel attachments are deployed.

Figure 9:
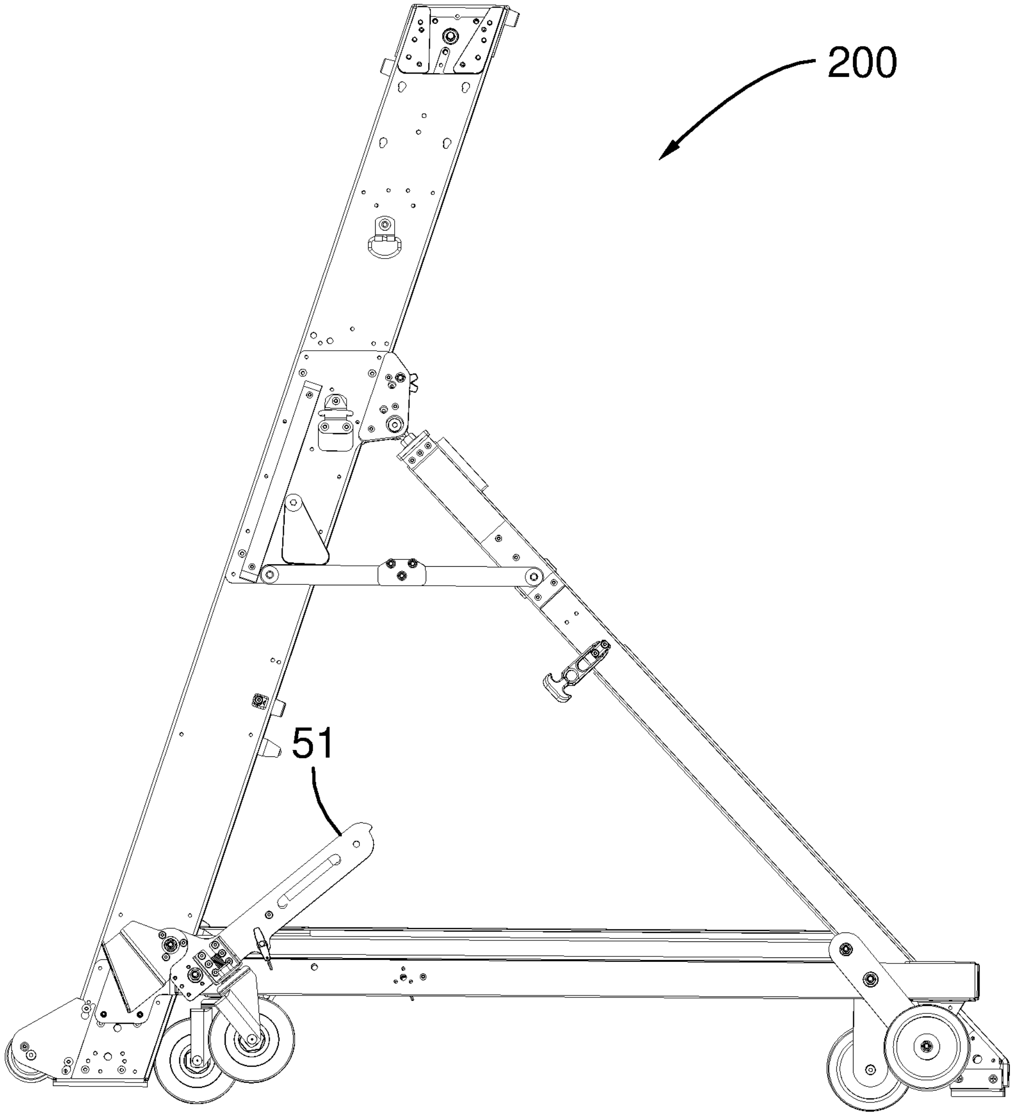
FIG. 9 is a side view of the ladder of FIG. 7.
Figure 10:
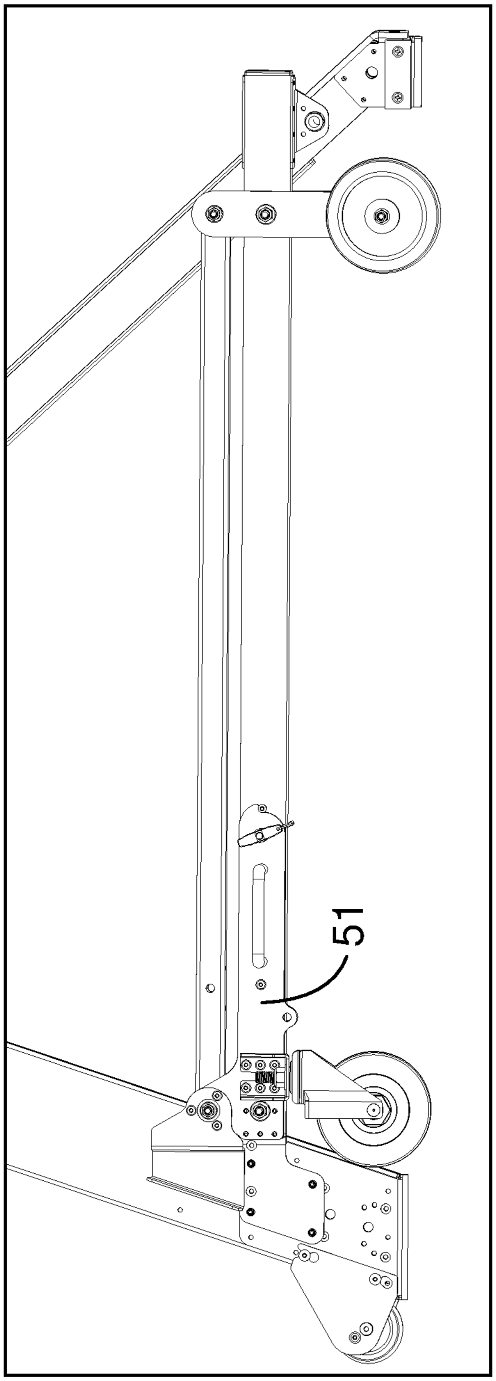
FIG. 10 is close-up, side view of the ladder of FIG. 8.
Figure 11:
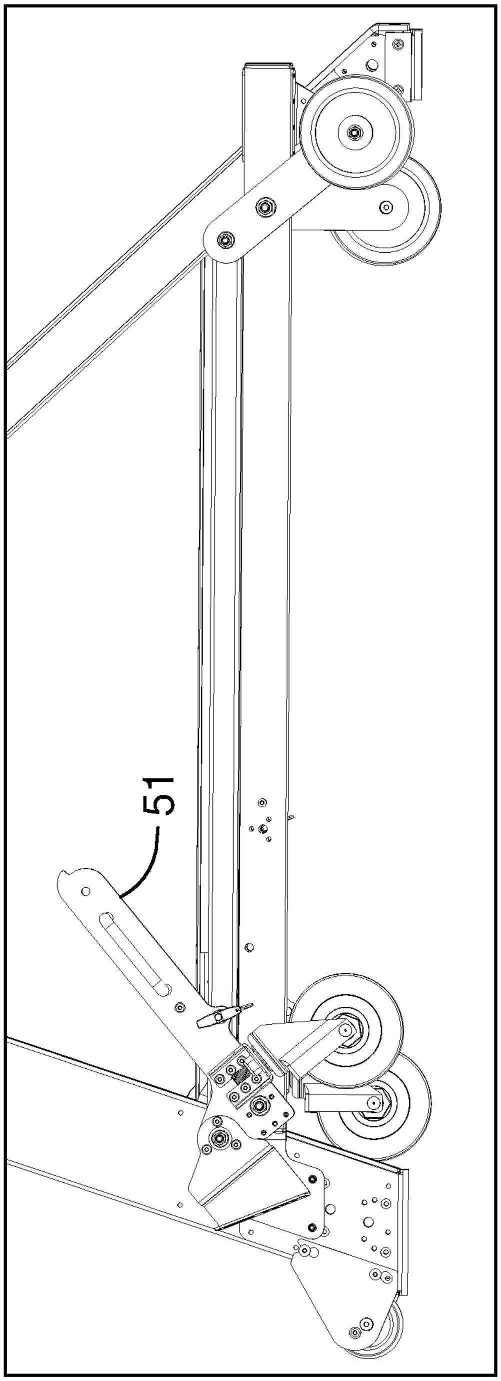
FIG. 11 is close-up, side view of the ladder of FIG. 9.
Figure 12:
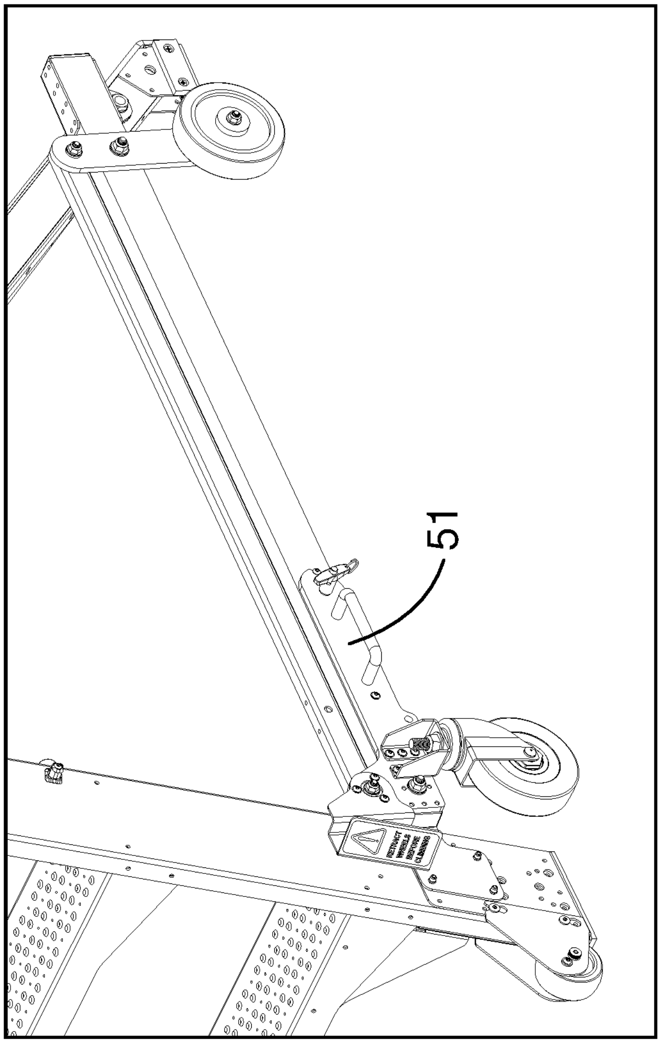
FIG. 12 is close-up, perspective view of FIG. 10 detailing the right wheel attachment in a deployed position.
Figure 13:
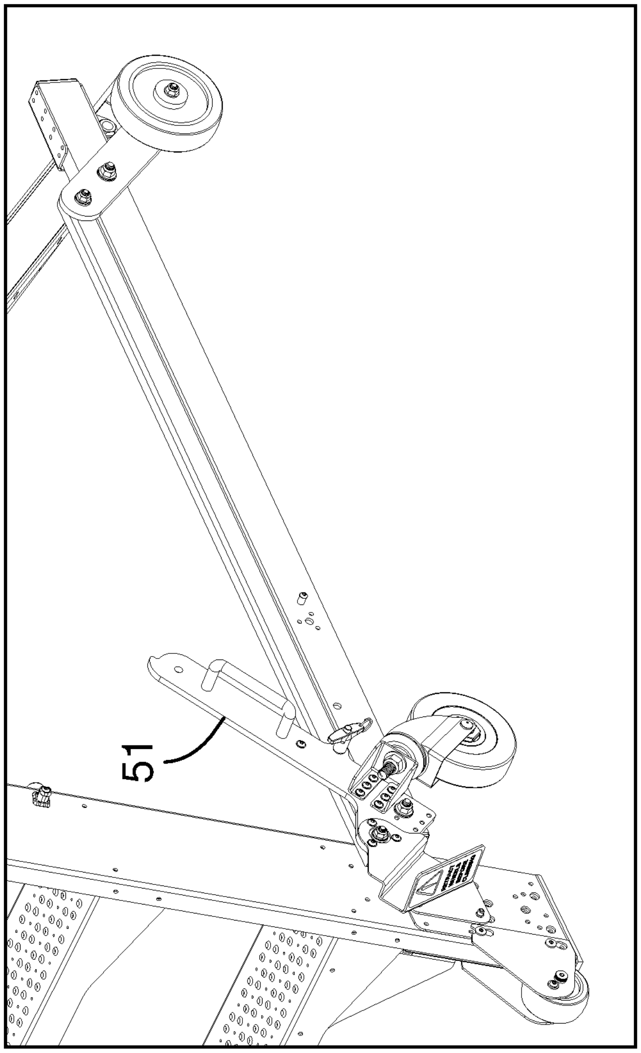
FIG. 13 is close-up, perspective view of FIG. 11 detailing the right wheel attachment in a disengaged position.

FIG. 9 is substantially identical to that shown in FIG. 8 except that FIG. 9 is a side view of the ladder of FIG. 7 where only the far wheel set is deployed (i.e., touching the ground) while the near wheel set is no longer deployed due to upward positioning of the engagement lever 51. FIGS. 10 and 11 further illustrate the aspect of the wheel deployment engaging and disengaging the ground surface where FIG. 10 is close-up, side view of the ladder of FIG. 8 and FIG. 11 is close-up, side view of the ladder of FIG. 9. Likewise, this wheel deployment may be viewed in perspective by way of FIGS. 12 and 13 where FIG. 12 is close-up, perspective view of FIG. 10 detailing the right wheel attachment in a deployed position and FIG. 13 is close-up, perspective view of FIG. 11 detailing the right wheel attachment in a disengaged position.

Figure 14:
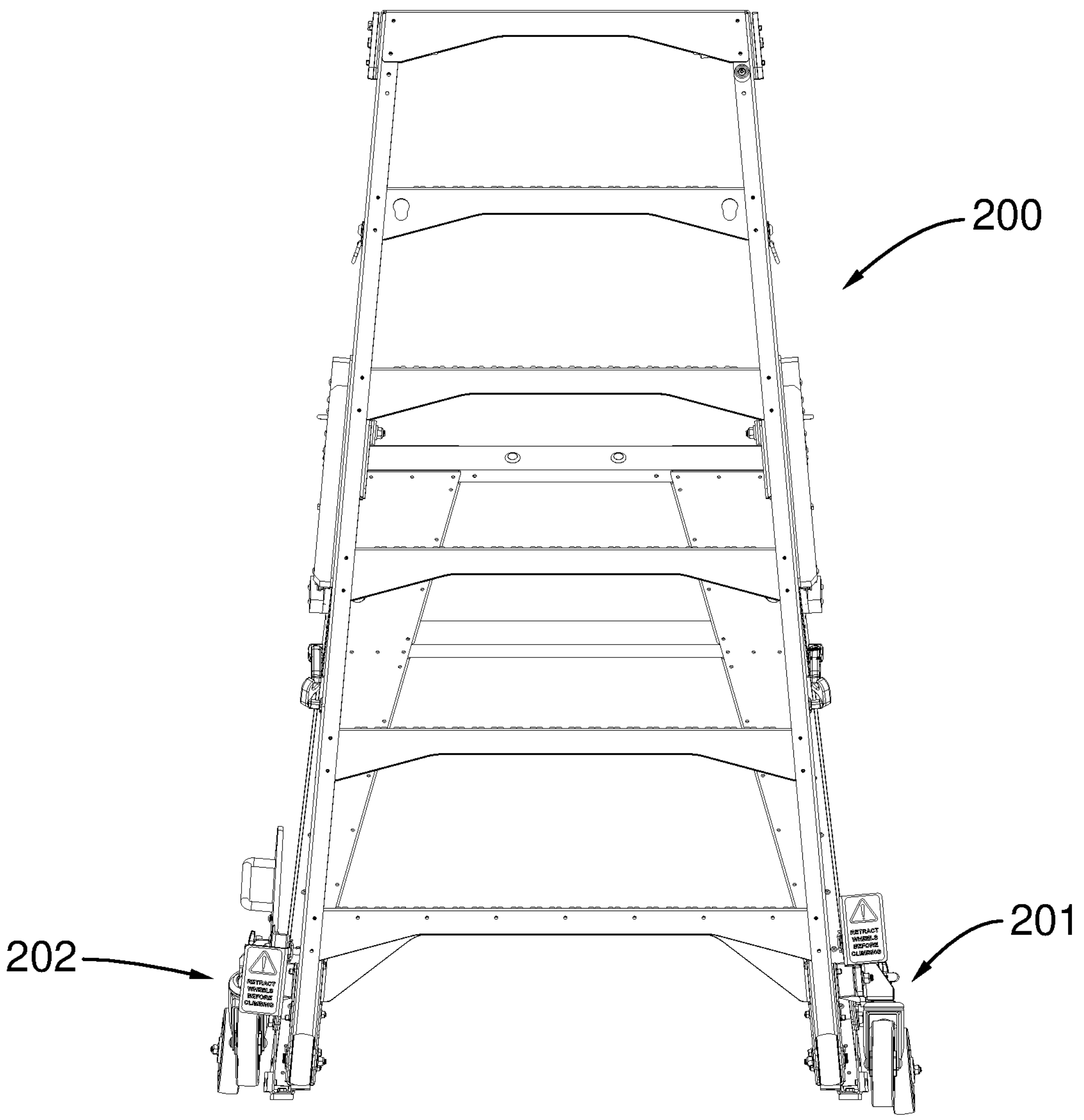
FIG. 14 is front view of FIG. 6 showing the right wheel attachment deployed and left wheel attachment disengaged.
Figure 15:
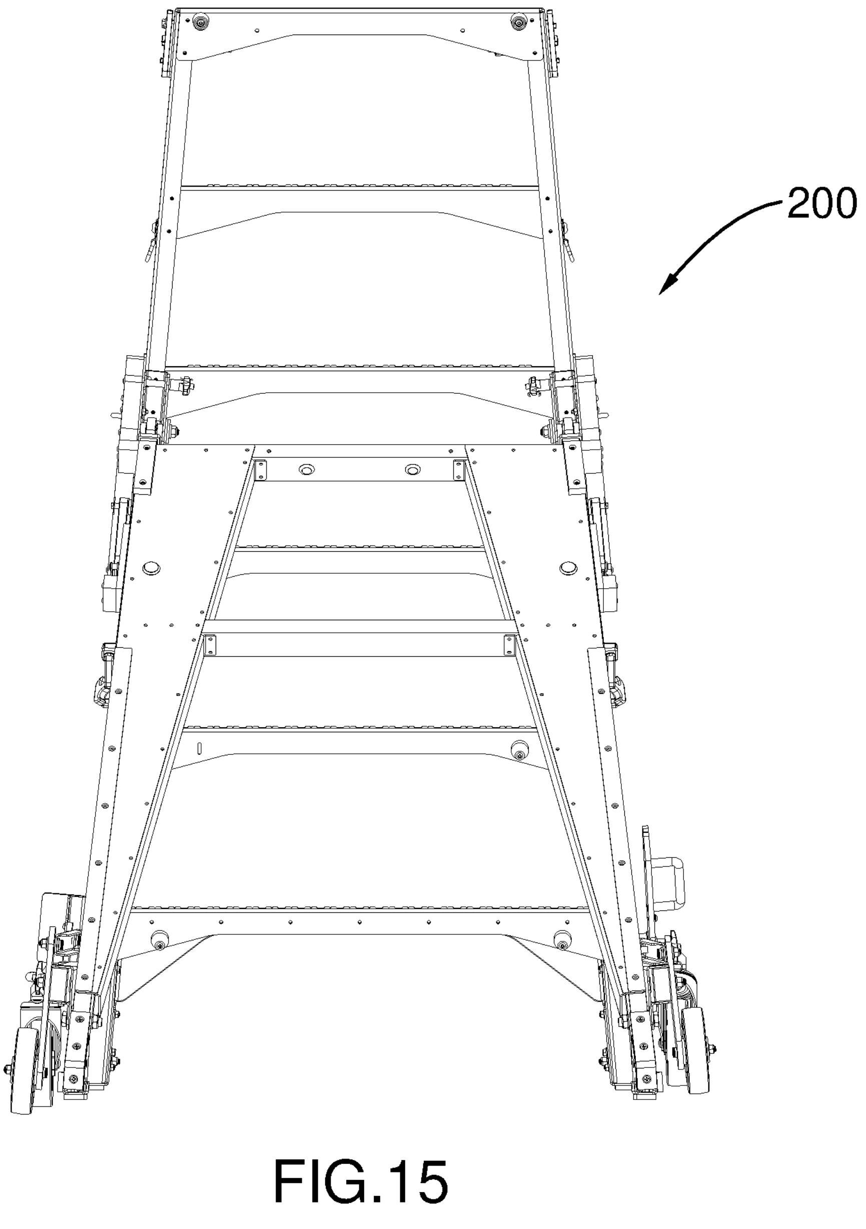
FIG. 15 is rear view of FIG. 14.
Figure 16:
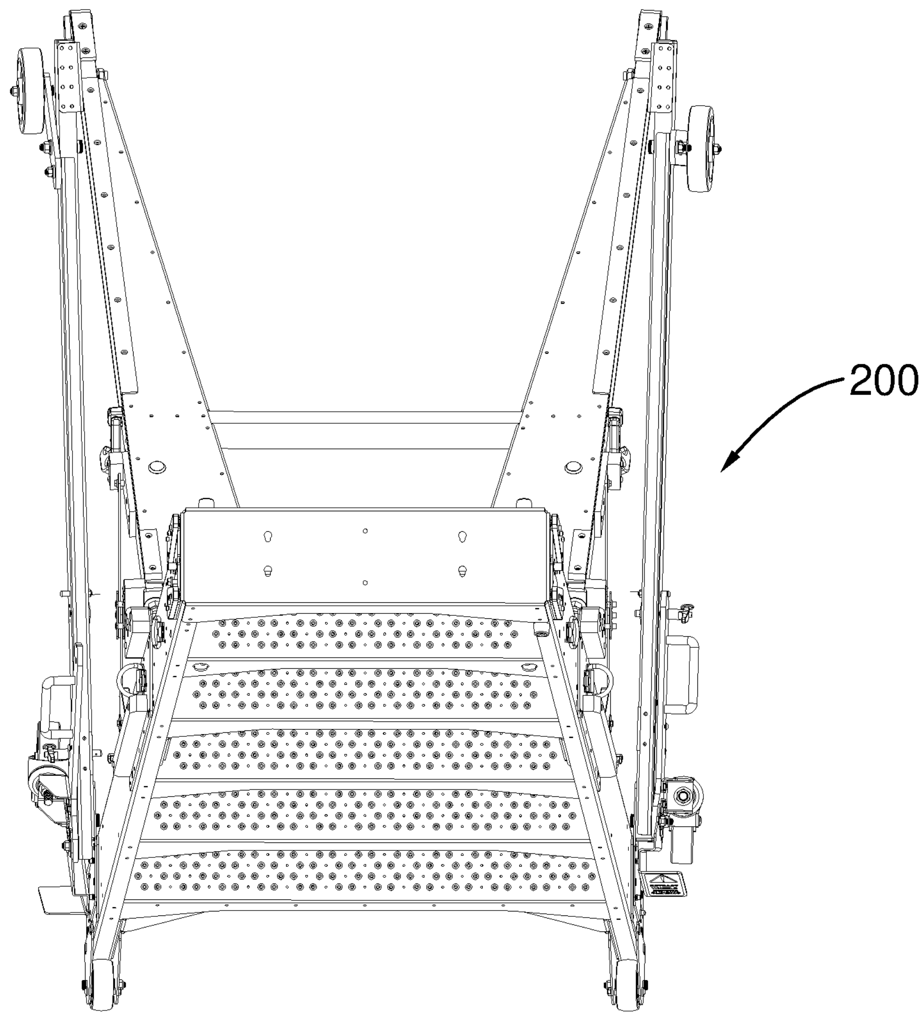
FIG. 16 is top view of FIG. 14.
Figure 17:
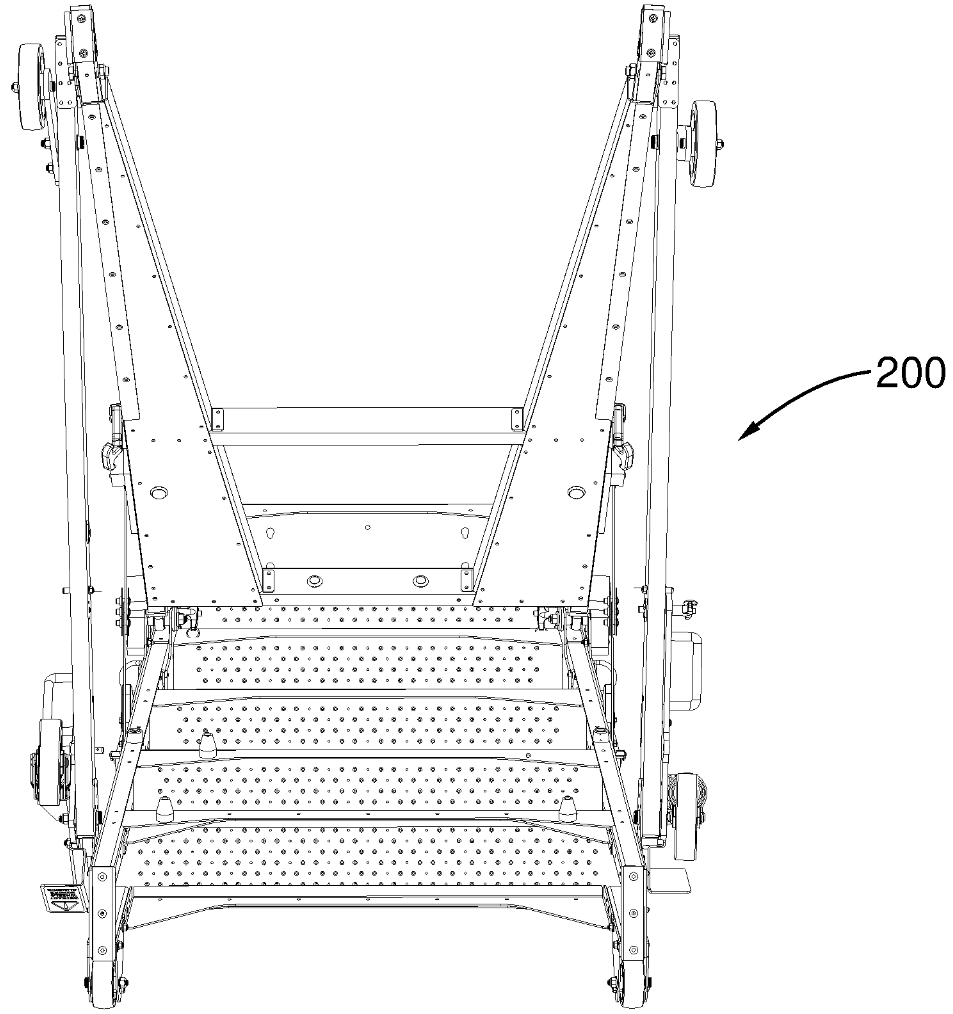
FIG. 17 is bottom view of FIG. 14.

Stability of the assembled configuration is enhanced by the outward and angled placement of the wheels themselves relative to the ladder structure (ladder/brace/support). This may be seen from FIG. 14 which illustrates a front view of FIG. 6 showing the right wheel attachment 201 deployed and left wheel attachment 202 disengaged. Similarly, FIG. 15 is rear view of FIG. 14 while FIG. 16 is top view of FIG. 14 and FIG. 17 is bottom view of FIG. 14.

Figure 18:
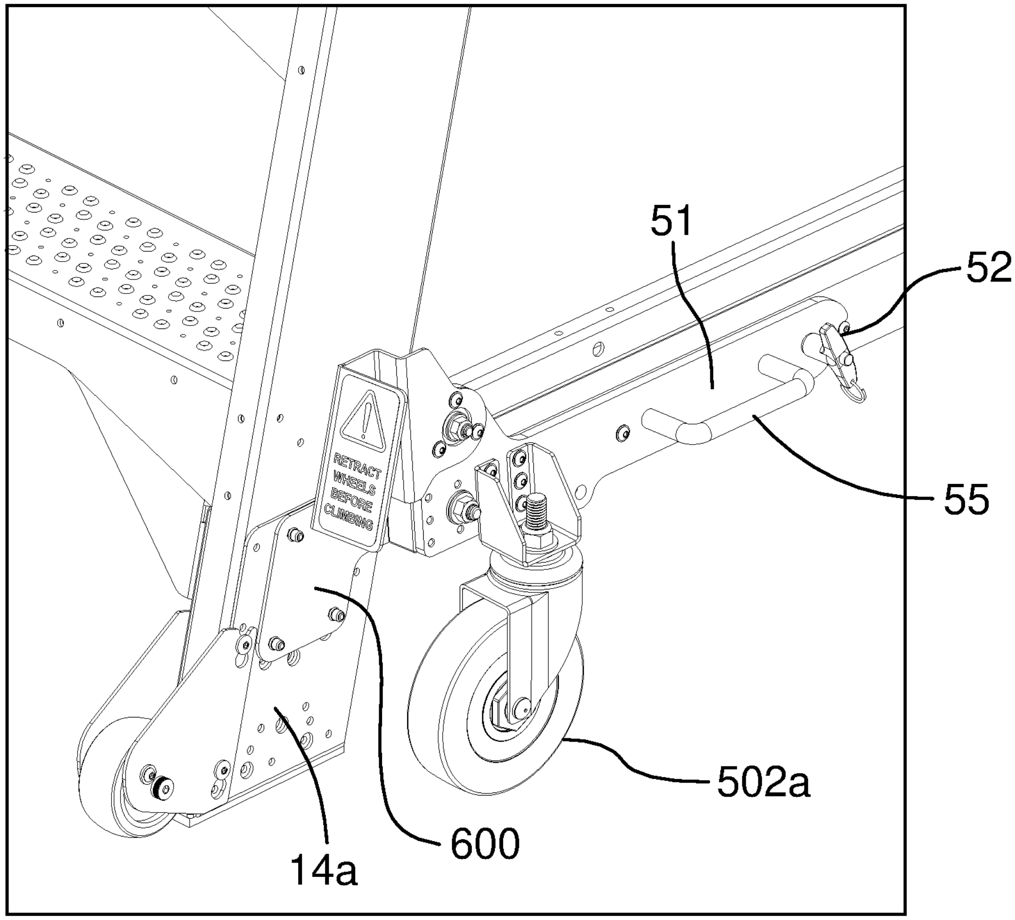
FIG. 18 is a front facing perspective view of the front right wheel in a deployed position.

The mechanism of the wheel attachment will now be shown and described in close up detail. FIG. 18 illustrates a front facing perspective view of the front right wheel 502*a* in a deployed position where the engagement lever 51 is in the down position and locked in place via locking pin 52. A handle 55 facilitates manual user actuation between the deployed and disengaged positions. As shown, the wheel attachment includes an attachment plate 600 for connection to the mounting placement 14*a*. Such connection may be accomplished by way of standard studs and bolts or any suitably similar fastening mechanism provided in kit form or assembled at time of ladder manufacture.

Figure 19:
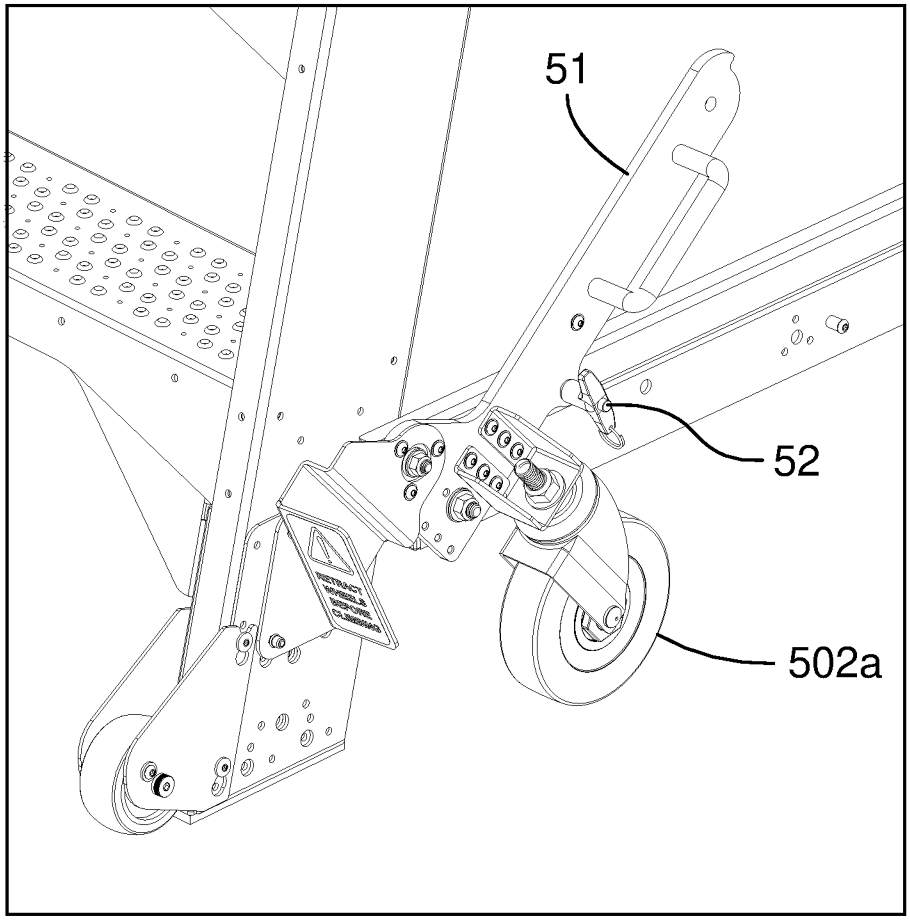
FIG. 19 is a front facing perspective view of the front right wheel in a disengaged position.

With further regard to FIG. 19, there is illustrated a front facing perspective view of the front right wheel in a disengaged position. In contrast to FIG. 18, the engagement lever 51 is in the up position thereby disengaging the wheel 502*a*. The deployed/disengaged movement of the engagement lever 51 also provides corresponding movement of a warning message as shown in FIGS. 18 and 19 by the exclamation symbol plate attached to the engagement lever 51 with a warning message "RETRACT WHEELS BEFORE CLIMBING". In the deployed position as shown in FIG. 18, the warning message is clearly visible to a user. However, upon disengagement as shown in FIG. 19, the warning plate is tilted downwards in a manner such that the warning plate is no longer easily seen by the user as the wheels are no longer engaged and the ladder is no longer in the mobile state. It should be well understood that the warning plate may be provided as shown or may consist of any visual aid in any appropriate language without straying from the intended scope of the present invention.

Figure 20:
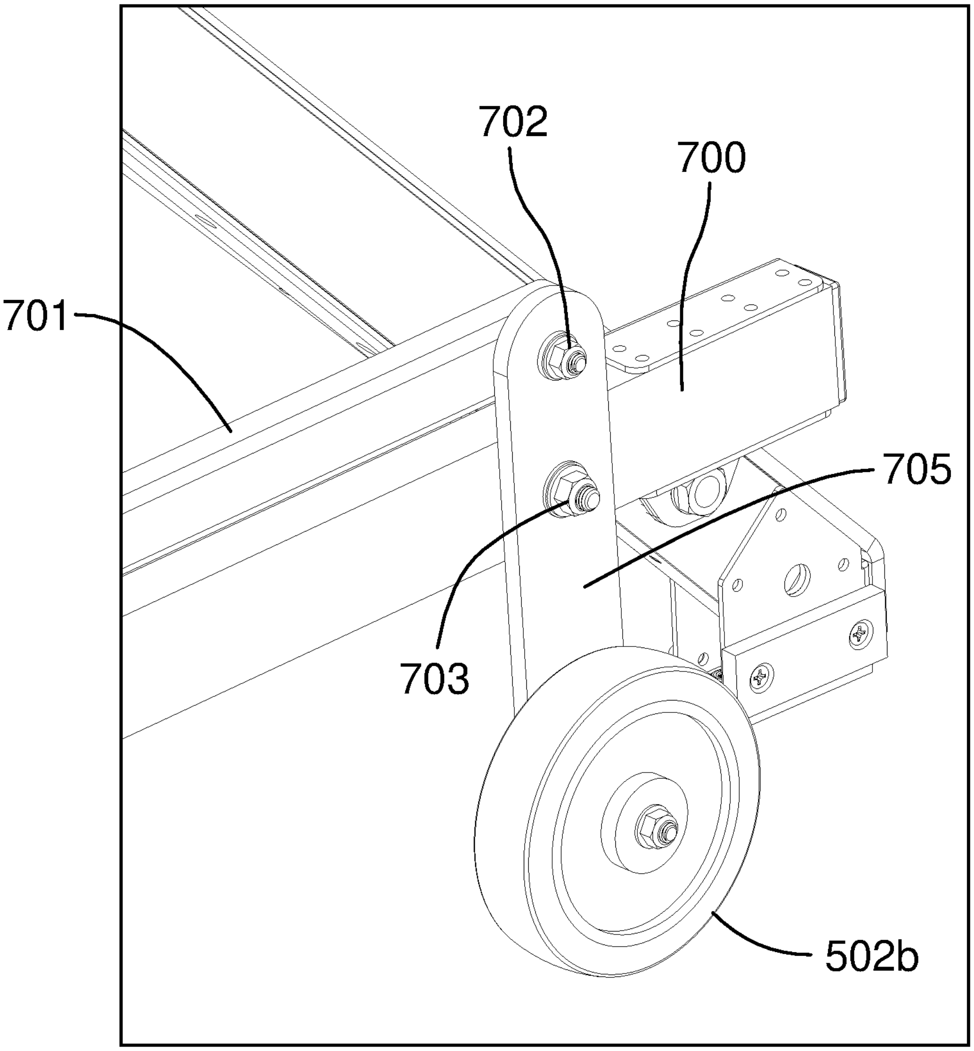
FIG. 20 is a front facing perspective view of the rear right wheel in a deployed position.
Figure 21:
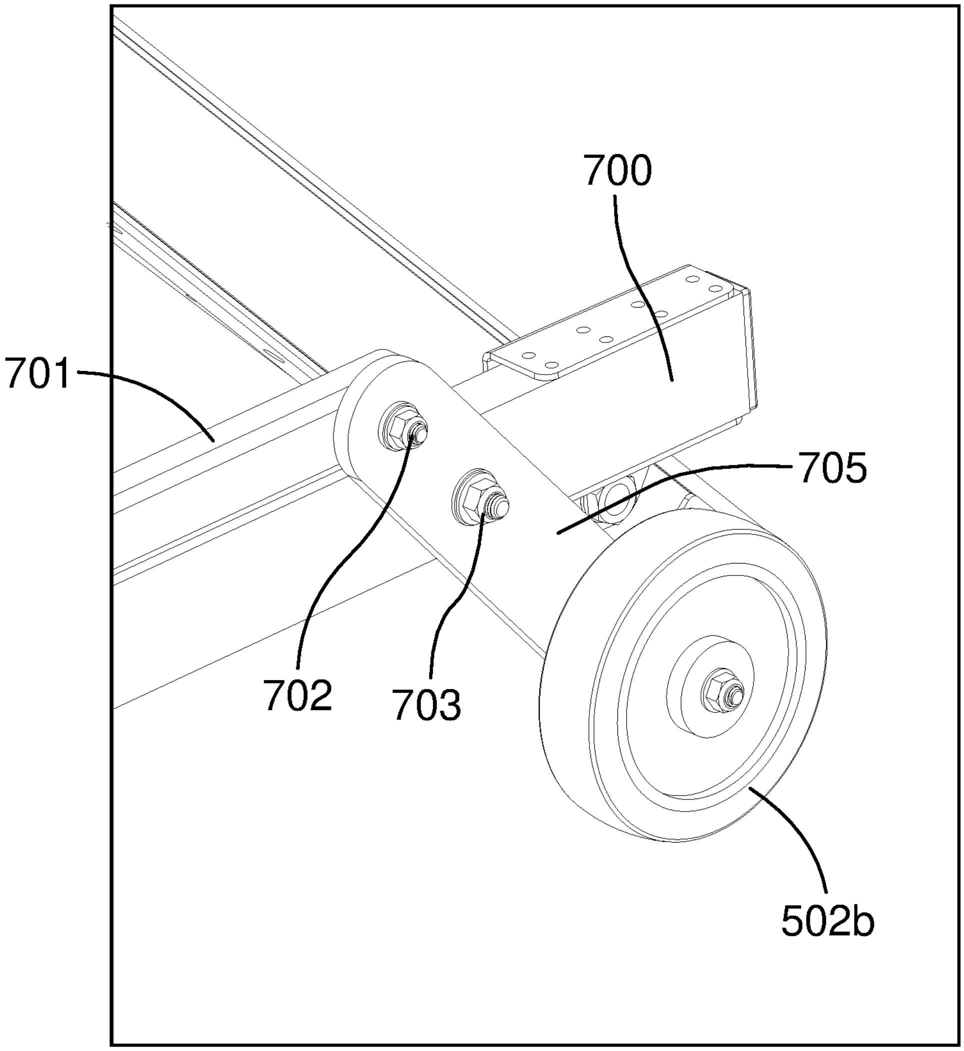
FIG. 21 is a front facing perspective view of the rear right wheel in a disengaged position.

FIGS. 20 and 21, respectively, illustrate a front facing perspective view of the rear right wheel 502*b* in a deployed position and a front facing perspective view of the rear right wheel 502*b* in a disengaged position. In these figures, the cantilever movement of the rear wheel arm 705 is seen. This effectively raises and lowers the wheel 502*b* due to the fact that the main beam 700 is fixed while the secondary beam 701 moves linearly upon actuation of the engagement lever (not shown). This provides relative pivoting about the bolts 702 and 703 as shown between the ground engaging position seen in FIG. 20 and the disengaged position seen in FIG. 21.

Figure 22:
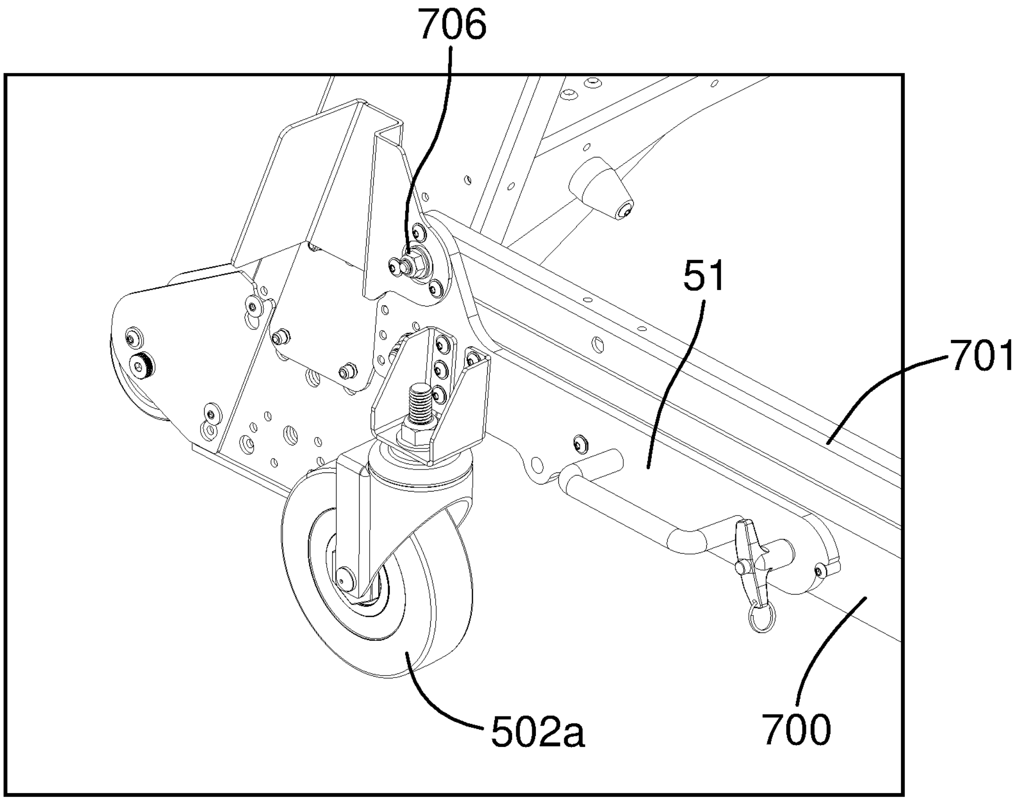
FIG. 22 is a rear facing perspective view of the front right wheel in a deployed position.
Figure 23:
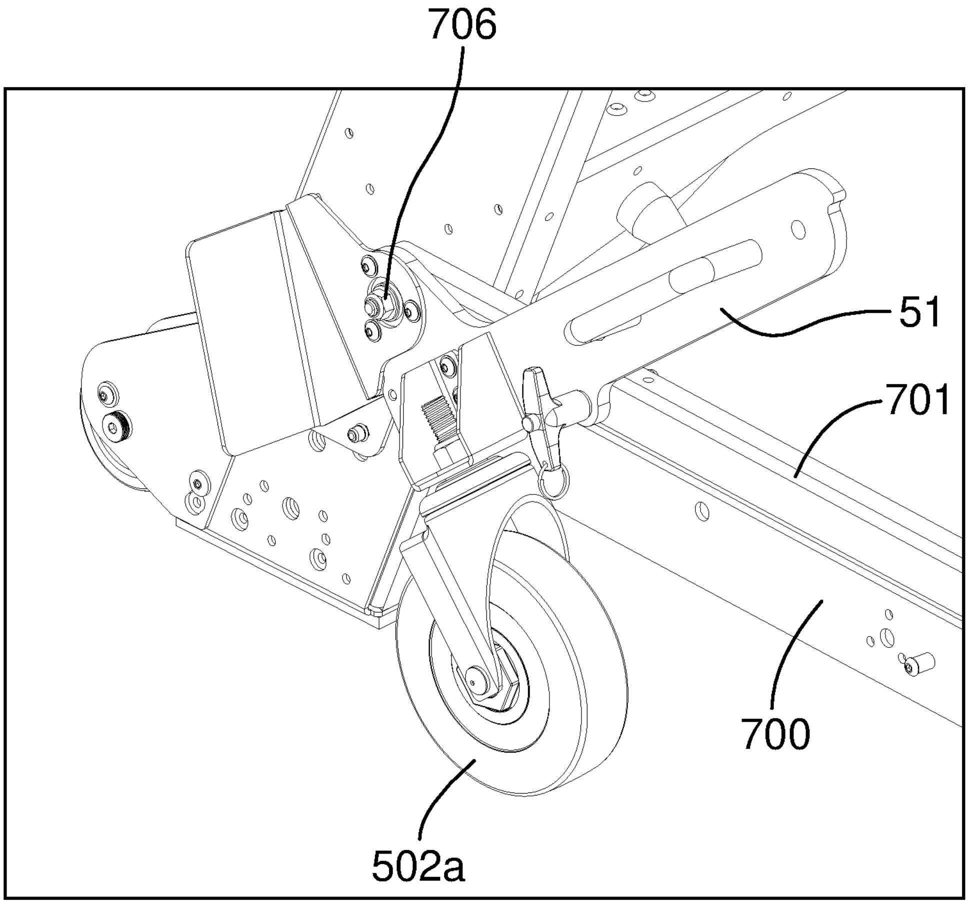
FIG. 23 is a rear facing perspective view of the front right wheel in a disengaged position.
Figure 24:
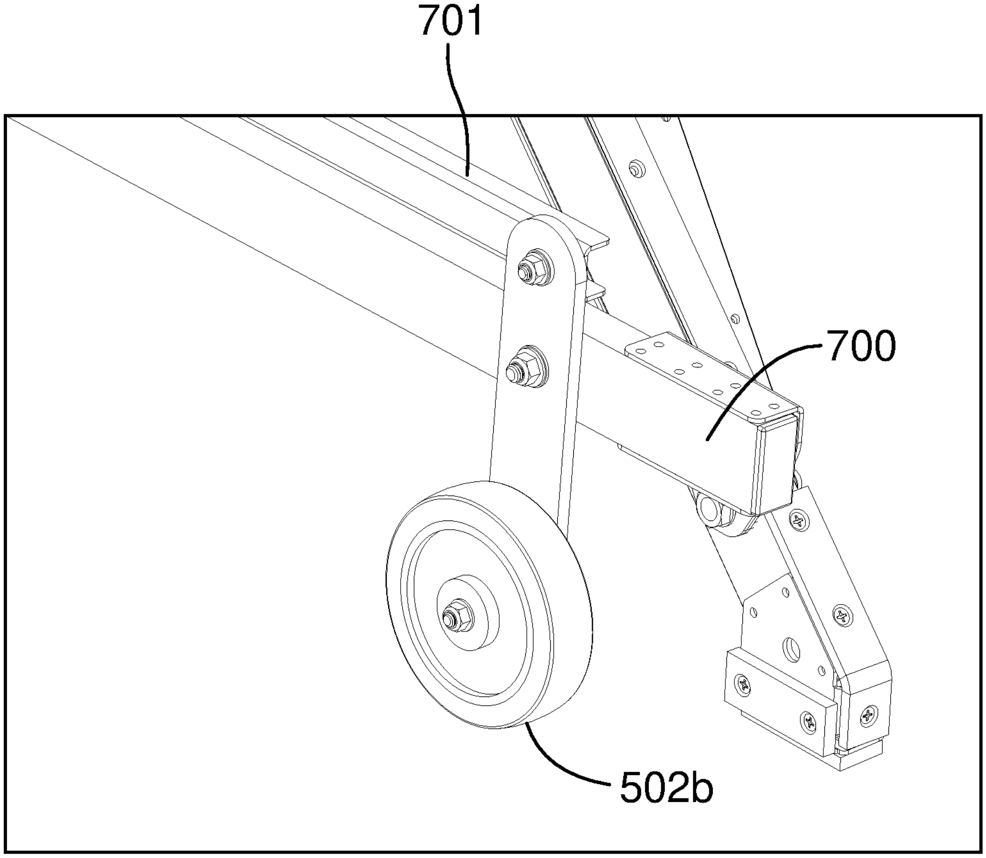
FIG. 24 is a rear facing perspective view of the rear right wheel in a deployed position.
Figure 25:
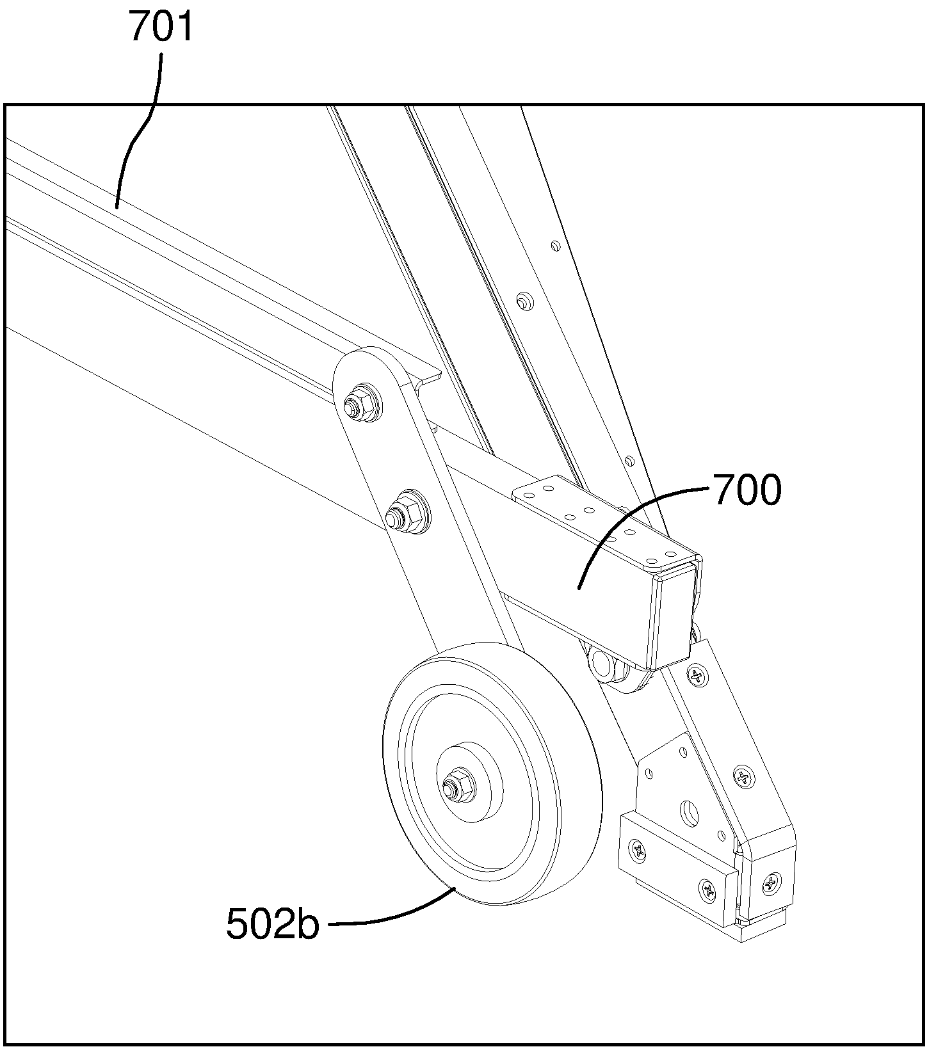
FIG. 25 is a rear facing perspective view of the rear right wheel in a disengaged position.

In a similar manner as shown and described above with reference to FIG. 18 through 21, the cantilever action between deployed and disengaged positions is also seen in 22 through 24. In particular, FIG. 22 illustrates the rear facing perspective view of the front right wheel 502*a* in a deployed position while FIG. 23 is a rear facing perspective view of the front right wheel 502*a* in a disengaged position. As previously described, the linear movement of the secondary beam 701 relative to the fixed main beam 700 when the engagement lever pivots about the bolt 706 causes the wheel 502*a* to move between the ground engaging position shown in FIG. 22 and the disengaged position seen in FIG. 23. Likewise, this cantilever action is again seen with regard to the rear wheel 502*b* upon linear movement of the secondary beam 701 relative to the fixed main beam 700 where FIG. 24 is a rear facing perspective view of the rear right wheel 502*b* in a deployed position and FIG. 25 is a rear facing perspective view of the rear right wheel 502*b* in a disengaged position.

Figure 26:
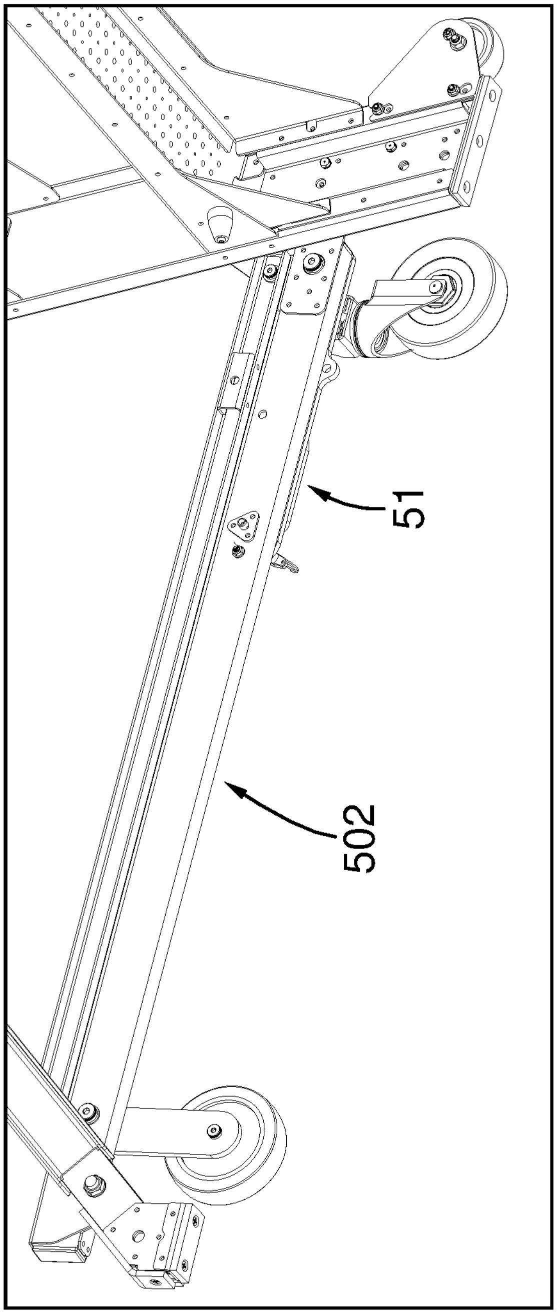
FIG. 26 is a detailed close-up view taken from below and interior to the right wheel attachment in a deployed position.
Figure 27:
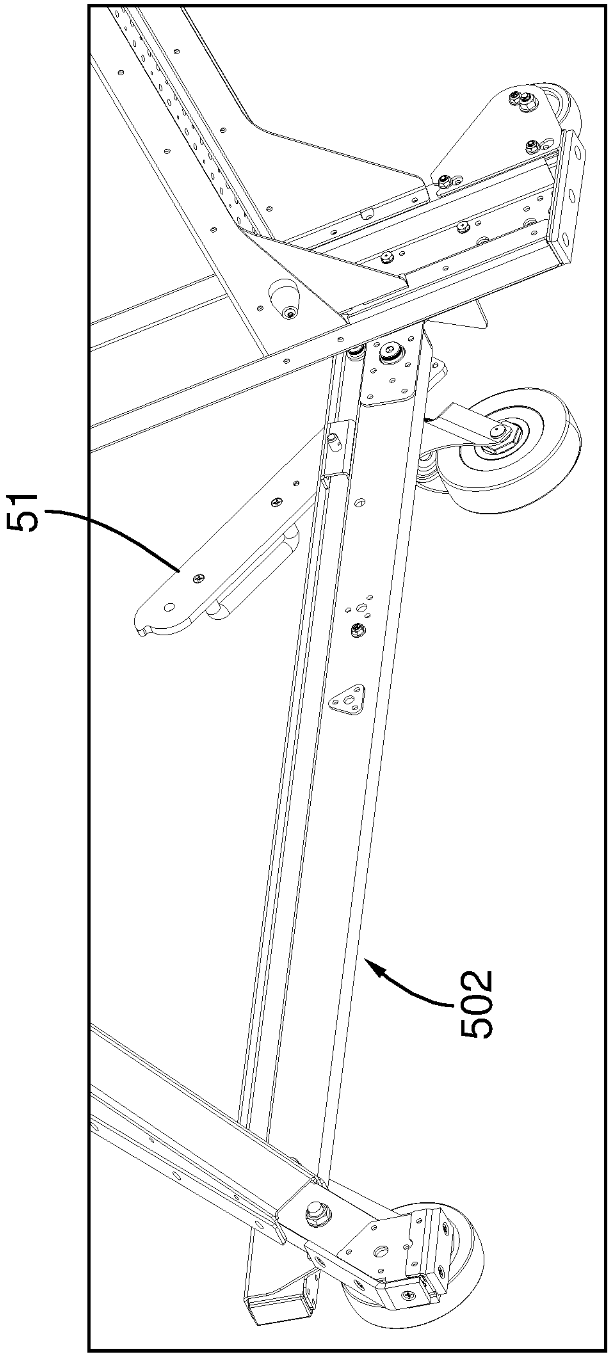
FIG. 27 is a detailed close-up view taken from below and interior to the right wheel attachment in a disengaged position.

With regard to FIG. 26, a detailed close-up view taken from below and interior to the right wheel attachment 502 is illustrated in a deployed position where the engagement lever 51 is shown in the up position. In contrast, FIG. 27 is a detailed close-up view taken from below and interior to the right wheel attachment 502 in a disengaged position when the engagement lever 51 (partially hidden) is shown in the down position.

Figure 28:
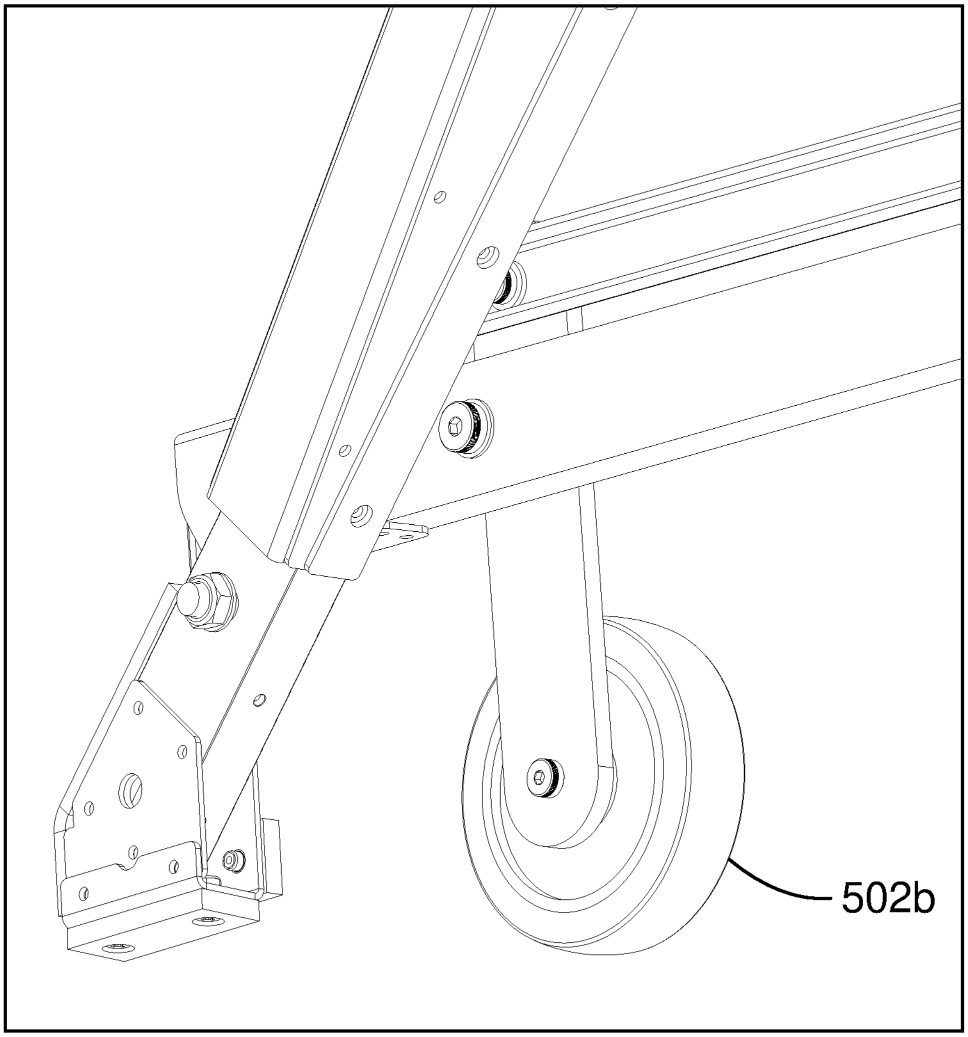
FIG. 28 is a detailed close-up view taken from below and interior to the rear right wheel in a deployed position.
Figure 29:
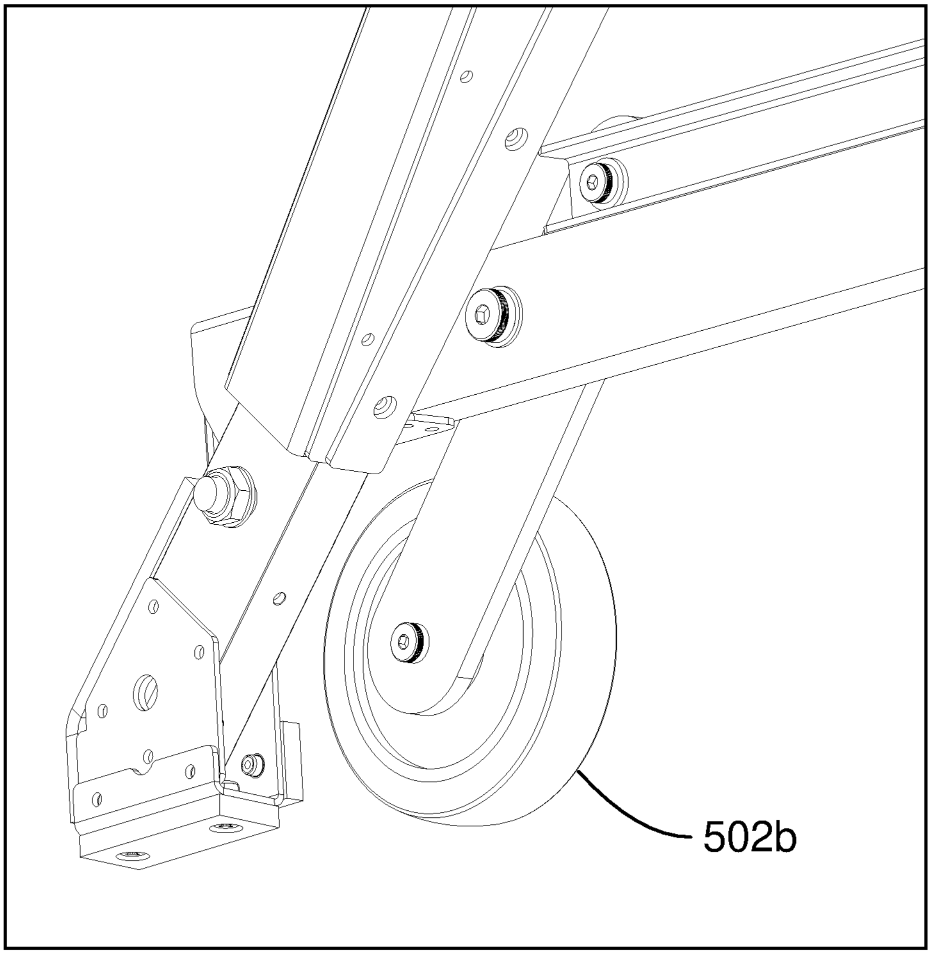
FIG. 29 is a detailed close-up view taken from below and interior to the rear right wheel in a disengaged position.

As already shown and described and similar to the front wheels adjacent the ladder unit, the rear wheels cantilever from a deployed position to a disengaged position. This is evident by way of FIG. 28 which illustrated a detailed close-up view taken from below and interior to the rear right wheel 502*b* in a deployed position while FIG. 29 is a detailed close-up view taken from below and interior to the rear right wheel 502*b* in a disengaged position. While the right wheel attachment has been shown and described, it should be readily apparent that the left wheel attachment is a mirror image of the right wheel attachment and they are both structurally and functionally identical relative to one another.

Figure 30:
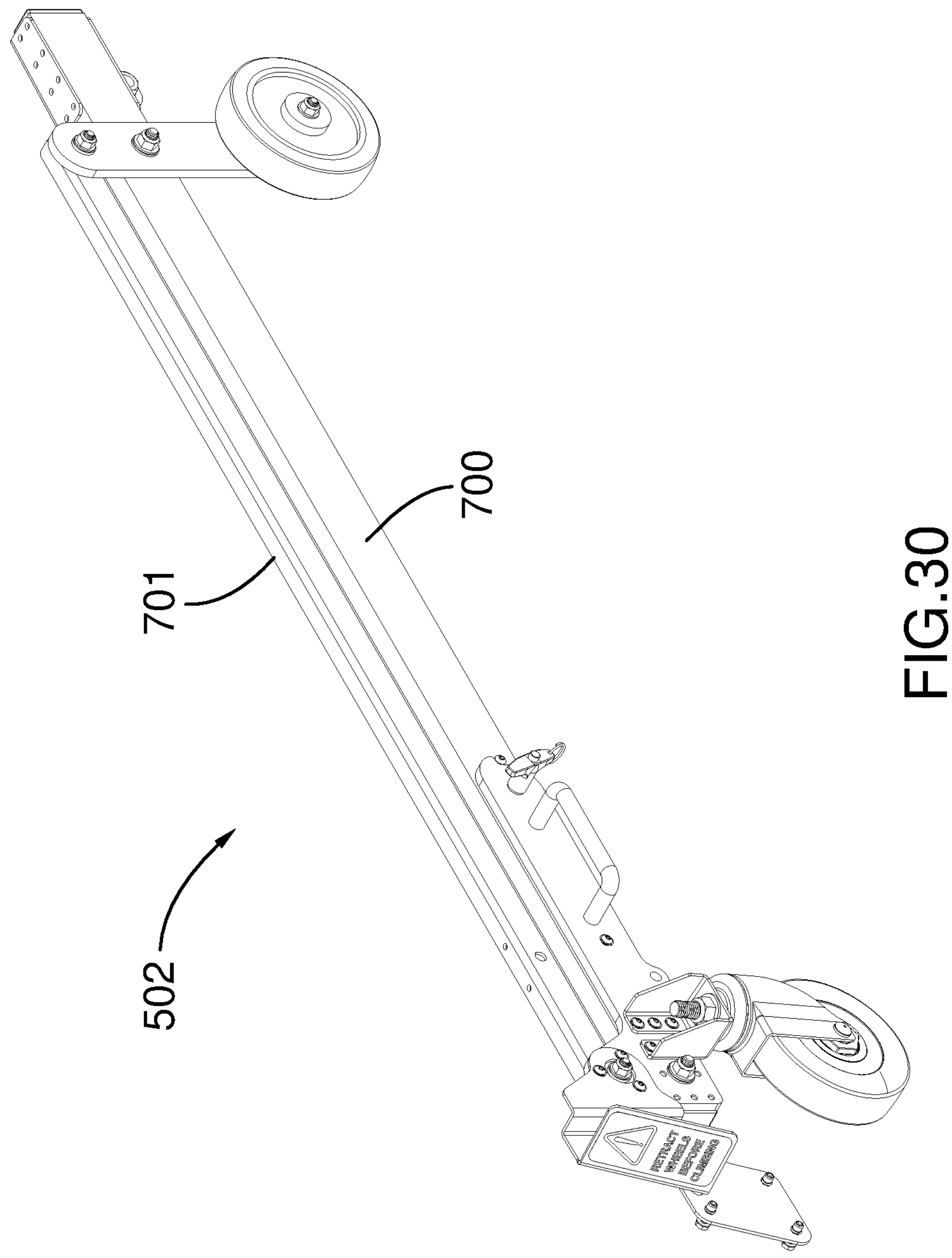
FIG. 30 is an outer perspective view of the right wheel attachment in a deployed position.
Figure 31:
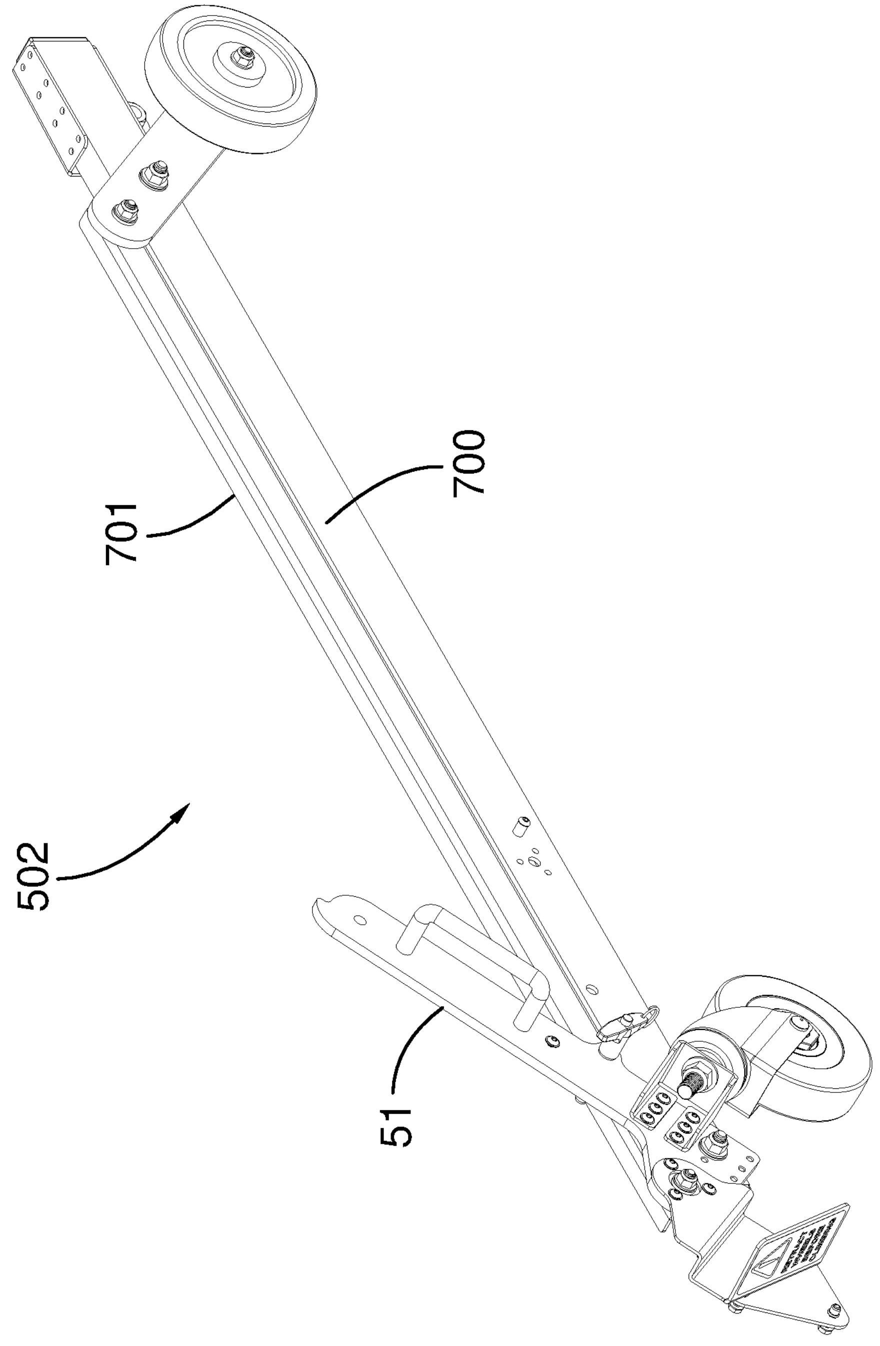
FIG. 31 is an outer perspective view of the right wheel attachment in a disengaged position.
Figure 32:
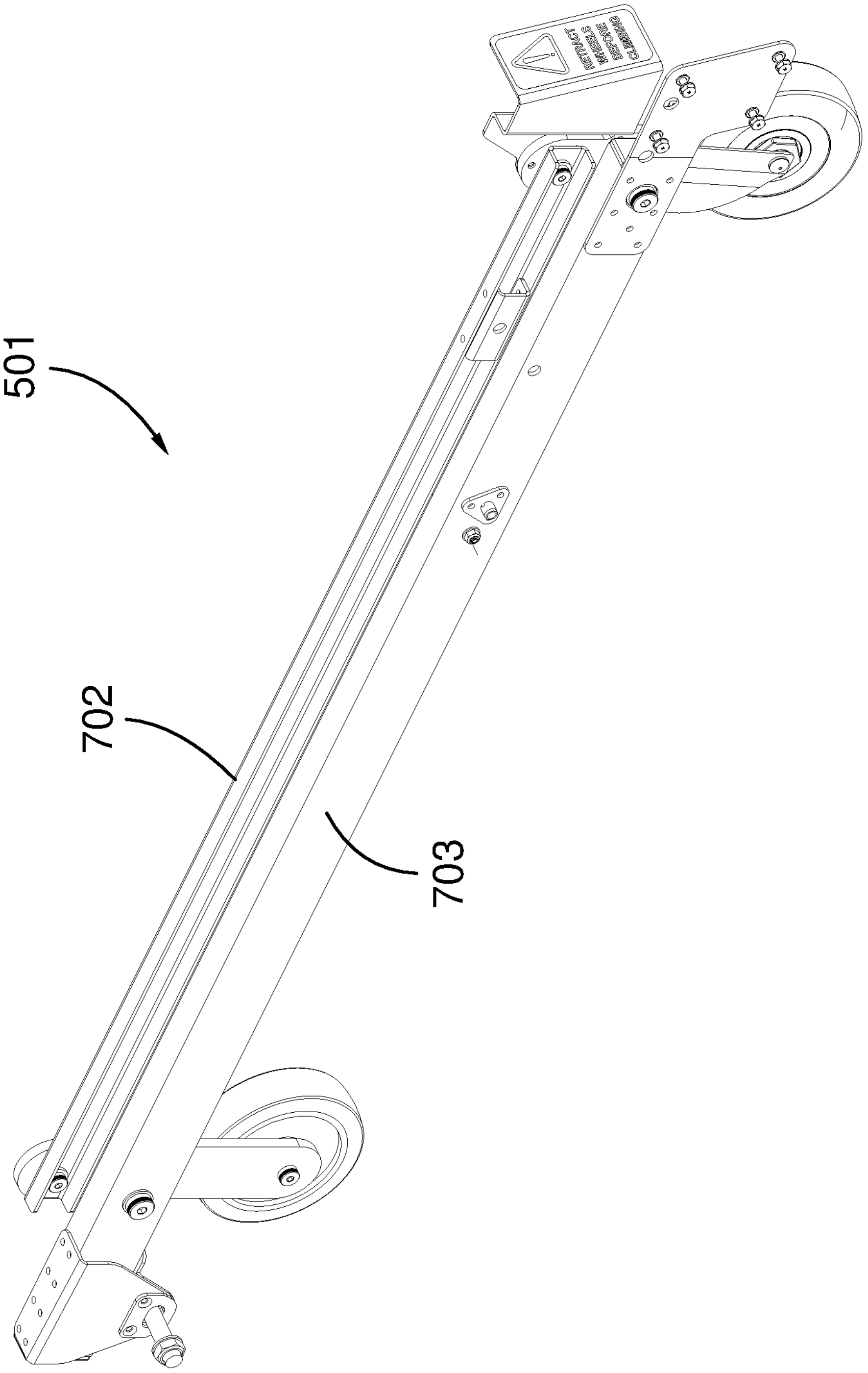
FIG. 32 is an inner perspective view of the left wheel attachment in a deployed position.
Figure 33:
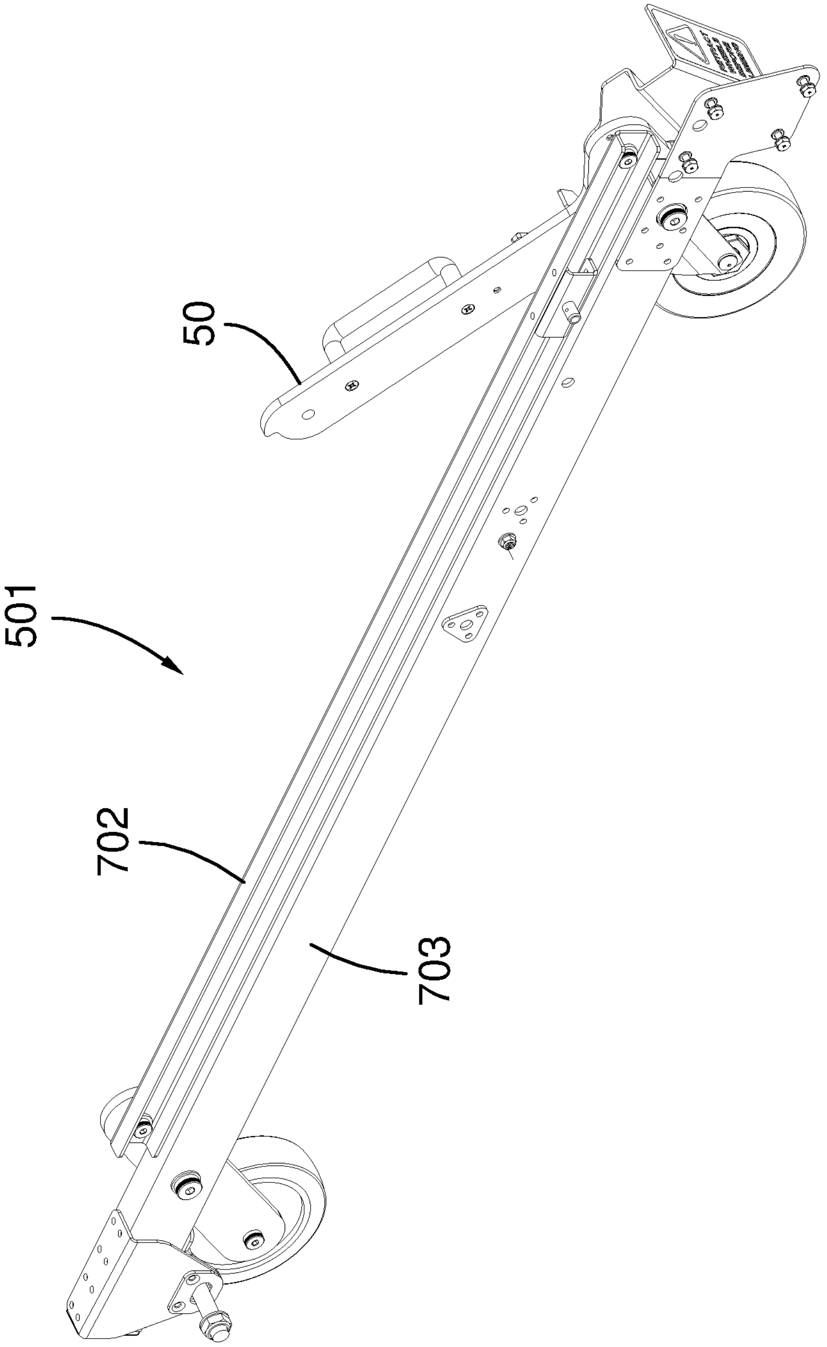
FIG. 33 is an inner perspective view of the left wheel attachment in a disengaged position.

The aforementioned mirror imaging of the right wheel attachment 502 and left wheel attachment 501 are illustrated by way of FIGS. 30 through 33. In particular, FIG. 30 is an outer perspective view of the right wheel attachment 502 in a deployed position while FIG. 31 is an outer perspective view of the right wheel attachment 502 in a disengaged position—i.e., engagement lever 51 is in the up position thereby actuating linear movement of the secondary beam 701 relative to the fixed main beam 700 thereby cantilevering the wheels upward. Likewise, FIG. 32 is an inner perspective view of the left wheel attachment 501 in a deployed position while FIG. 33 is an inner perspective view of the left wheel attachment 501 in a disengaged position—i.e., engagement lever 50 is in the up position thereby actuating linear movement of the secondary beam 702 relative to the fixed main beam 703 thereby cantilevering the wheels upward.

As shown and described, the present invention may be provided in a fully manufactured and assembled configuration or may equally be provided as an after market kit for assembly with or without the ladder structure included.

The foregoing description of certain embodiments of the invention has been presented for the purposes of illustration and description. It is not intended to be exhaustive or to limit the invention to the precise form disclosed. Many modifications and variations are possible in light of the above teachings. Therefore, it is intended that the scope of the invention be limited not by this detailed description, but rather by the claims appended hereto.

What is claimed is:

1. A folding ladder system comprising:

(a) a folding ladder having right and left sides, the folding ladder comprising a step unit having right and left sides, each side having a foot and a first mounting placement adjacent the foot;

a pair of parallel support legs, one provided on each of the right and left sides of the ladder, each of the support legs having (a) an upper end connected to one of the sides of the step unit at a hinge point, and (b) a lower end having a foot and a second mounting placement adjacent the foot; and a pair of hinged brace mechanisms, each brace mechanism extending between the step unit and one of the support legs, the brace mechanisms being movable between an angled position in which the folding ladder is folded and a straight position in which the brace mechanisms retain the step unit and the support legs in an A-frame configuration; and (b) a pair of wheel attachments, configured to be selectively removed and fixedly attached to the folding ladder, each of the wheel attachments extending, when attached, between the first mounting placement and the second mounting placement on one side of the ladder, each wheel attachment comprising a fixed main beam having a first end and a second end, a first attachment device on the first end configured to engage the first mounting placement, and a second attachment device on the second end configured to engage the second mounting placement;

a secondary beam extending generally parallel to the main beam;

an engagement lever pivotably mounted on the main beam so that pivoting movement of the lever causes the secondary beam to move linearly relative to the main beam;

a first wheel mounted at the first end, and a second wheel mounted at the second end, the wheels being mounted so that linear movement of the secondary beam in response to pivoting of the engagement lever causes the second wheel to pivot from a deployed position to a raised position, and movement of the engagement lever causes the first wheel to pivot from a deployed position to a raised position;

wherein when the wheel attachments are not mounted on the folding ladder the brace mechanisms provide the sole support for the A-frame configuration, and when the wheel attachments are mounted on the folding ladder additional support for the A-frame configuration is provided by the main beams of the wheel assemblies.

2. The folding ladder system of claim 1 wherein the second wheel is mounted at a distal end of a rear wheel arm, the rear wheel arm being mounted on the main beam and the secondary beam such that linear movement of the secondary beam causes the rear wheel arm to pivot about its attachment to the main beam.

3. The folding ladder system of claim 2 wherein the first wheel is mounted on the lever and the lever pivots about a mounting point attaching the lever to the main beam.

4. The folding ladder system of claim 1 wherein downward pivoting movement of the lever causes the wheels to move into the deployed position and upward pivoting movement of the lever causes the wheels to move into the raised position.

5. The folding ladder system of claim 1 further including a handle located on each engagement lever.

6. The folding ladder system of claim 5 further including a locking pin movable between a first location and a second location corresponding to the deployed position and the raised position of the wheels.

7. The folding ladder system of claim 6 further including a warning plate attached to the lever and movable between a display location and a non-display location.

8. The folding ladder system of claim 1 wherein the second mounting placement comprises a reinforced through hole and the second attachment device comprises a bolt configured to be received in the through hole.

9. The folding ladder system of claim 1 wherein the first mounting placement comprises a reinforced plate and the first attachment device comprises a plate configured to be joined to the reinforced plate by one or more fastening mechanisms.

* * * * *